United States Patent [19]

Picunko et al.

[11] 3,997,784
[45] Dec. 14, 1976

[54] AUTOMATIC APPARATUS FOR DISPENSING RADIODIAGNOSTIC AGENTS AND METHOD THEREFOR

[75] Inventors: Thomas Picunko; Edward Whittum Larrabee, both of Bronxville, N.Y.

[73] Assignee: Union Carbide Corporation, New York, N.Y.

[22] Filed: June 16, 1975

[21] Appl. No.: 587,283

[52] U.S. Cl. .................. 250/328; 250/432 PD
[51] Int. Cl.$^2$ ........................................ G01T 1/00
[58] Field of Search .................. 250/328, 432 PD

[56] References Cited

UNITED STATES PATENTS 3,774,036  11/1973  Gerhart .................. 250/432 PD

*Primary Examiner*—Harold A. Dixon
*Attorney, Agent, or Firm*—Israel Blum

[57] ABSTRACT

Apparatus and method for automatically measuring the activity of a radioactive solution, such as technetium, and diluting it with a diluent solution, such as saline, to yield a preselected volume of the resultant radioactive solution having a preselected dose concentration.

22 Claims, 14 Drawing Figures

AUTOMATIC APPARATUS FOR DISPENSING RADIODIAGNOSTIC AGENTS AND METHOD THEREFOR

This invention relates to apparatus and method for automatically measuring the activity of a radioactive solution such as technetium and diluting it with an appropriate solution such as saline to yield a preselected volume of a radioactive solution, the preselected resultant radioactive solution having a preselected dose concentration.

Radioactive reagents such as technetium have been extremely useful tools in medical applications, particularly as radionuclide tracers in both medical research and diagnosis. For example, technetium-99m's short half-life (6 hours) reduces exposure of the organs to radiation; its gamma radiation energy (140 Kev.) not only provides sufficient tissue penetration but also is readily collimated; and absence of beta radiation permits millicurie amounts of the radionuclide to be administered orally or by injection into the patient without harmful radiation dosage. Due to these physical characteristics, technetium-99m is frequently used in combination with appropriate carriers for in vivo diagnostics tests such as scintigraphic examinations of the liver, lungs, blood pool, bone and tumors. Becaue no operation is required for diagnosis, the popularity of this method has increased in recent years.

Chemically, technetium belongs to group VII-A of the Periodic Table of the Elements and there are many similarities between its chemistry and the chemistry of manganese and rhenium. In aqueous solution, the most stable form of technetium is the pertechnetate ion ($TcO_4$), which is similar to iodide in its biological distribution, thereby rendering it useful in scanning. Moreover, the ability of technetium to combine with other materials when reduced to lower oxidation states makes it useful both when chelated with an appropriate carrier for kidney or blood function studies and also when trapped physically as a colloid for liver studies or as a particle for lung studies. Since technetium-99m has such a short half-life, it is commonly extracted from its parent element, 2.7 molybdenum-99, as required, via a generator wherein $^{99m}Tc$ is eluted from $^{99}Mo$. Moreover, technetium in the form of sodium pertechnetate in an isotonic saline solution is generally mixed with an appropriate carrier to label it for use in various scintigraphic examinations.

However, as with all other radioactive materials, care has to be used in its handling in order to minimize radiation exposure to personnel at medical or laboratory facilities. Concentrated radioactive technetium solution must be measured for activity with an instrument at each medical facility or laboratory and the volume of saline required to dilute the radioactive technetium solution to a useful dose suitable for patients must be calculated. In addition, the dose to be administered to the patient must also be manually prepared, measured and loaded into a syringe prior to injection into the patient. Furthermore, a check must be made to see that the technetium has not been contaminated with molybdenum, its parent isotope. The manual preparation of a patient dose of radioactive technetium, therefore, increases the exposure of personnel at medical or laboratory facilities and increase the chances of error or accident during handling of the radioactive technetium.

It is, therefore, an object of the present invention to provide an easily operated apparatus and method for automatically (1) measuring the activity of a radioactive technetium solution and (2) diluting a calculated volume of the radioactive solution with a calculated volume of saline solution to yield a resultant radioactive technetium solution having a preselected volume and dose concentration. Another object of this invention is to provide an apparatus and method for automatically dispensing technetium which ensures uniformity of patient doses and minimizes radiation exposure to occupational workers. Other objects will be apparent from the following description in claims taken in conjunction with the drawings in which FIG 1 shows an isometric sketch of an assemblied and enclosed apparatus in accordance with the present invention.

Figure 9A:
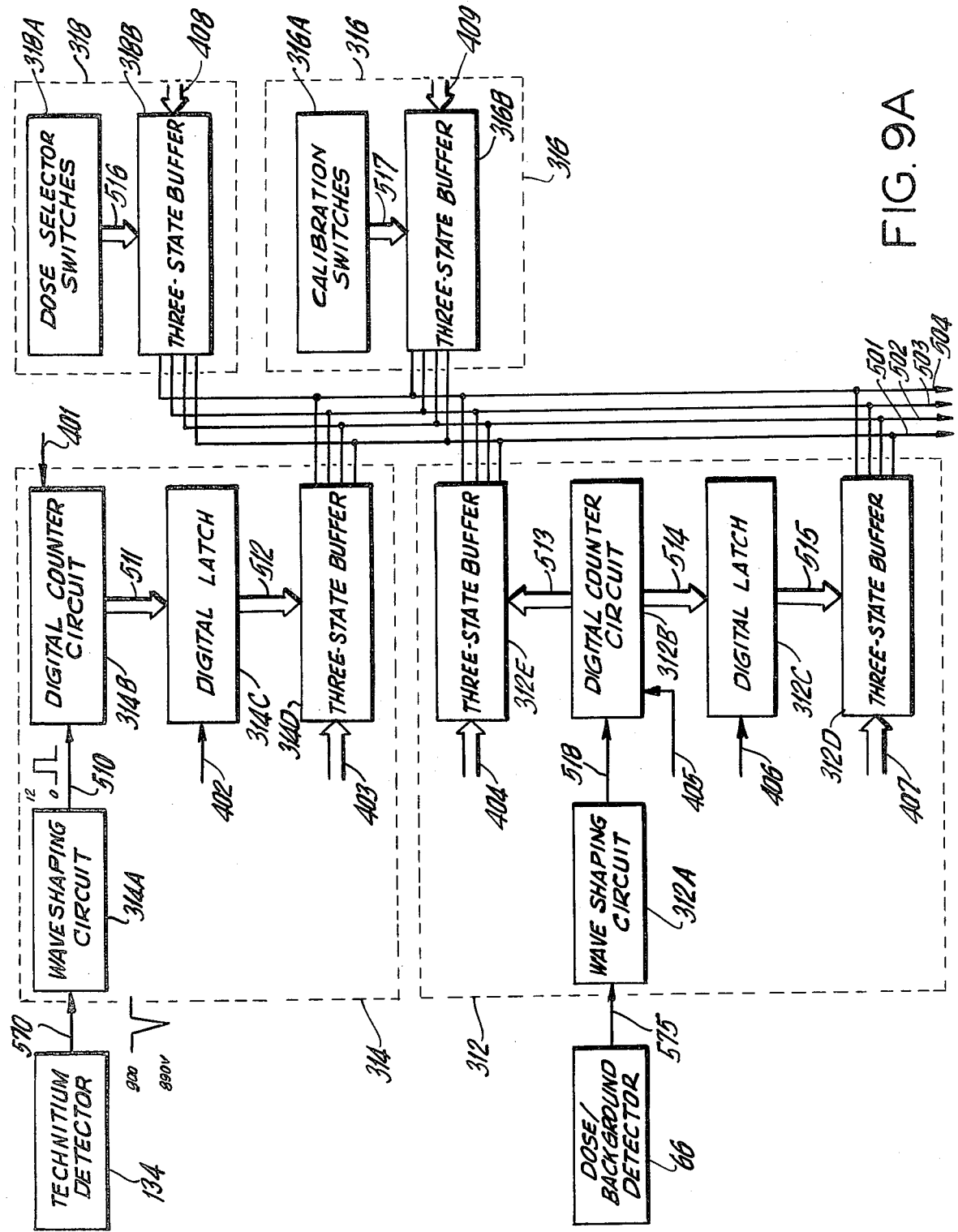
Figure 9B:
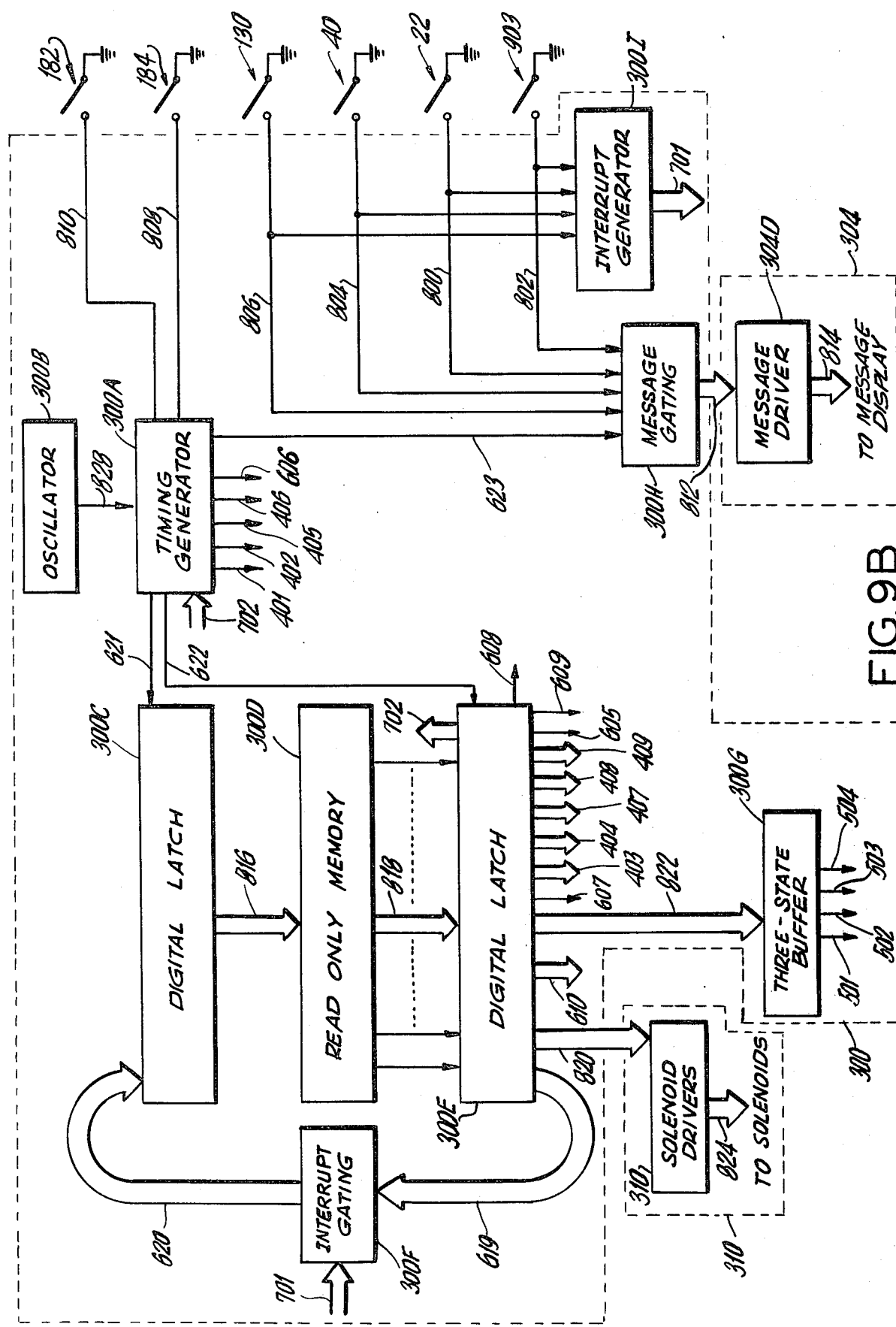
Figure 9C:
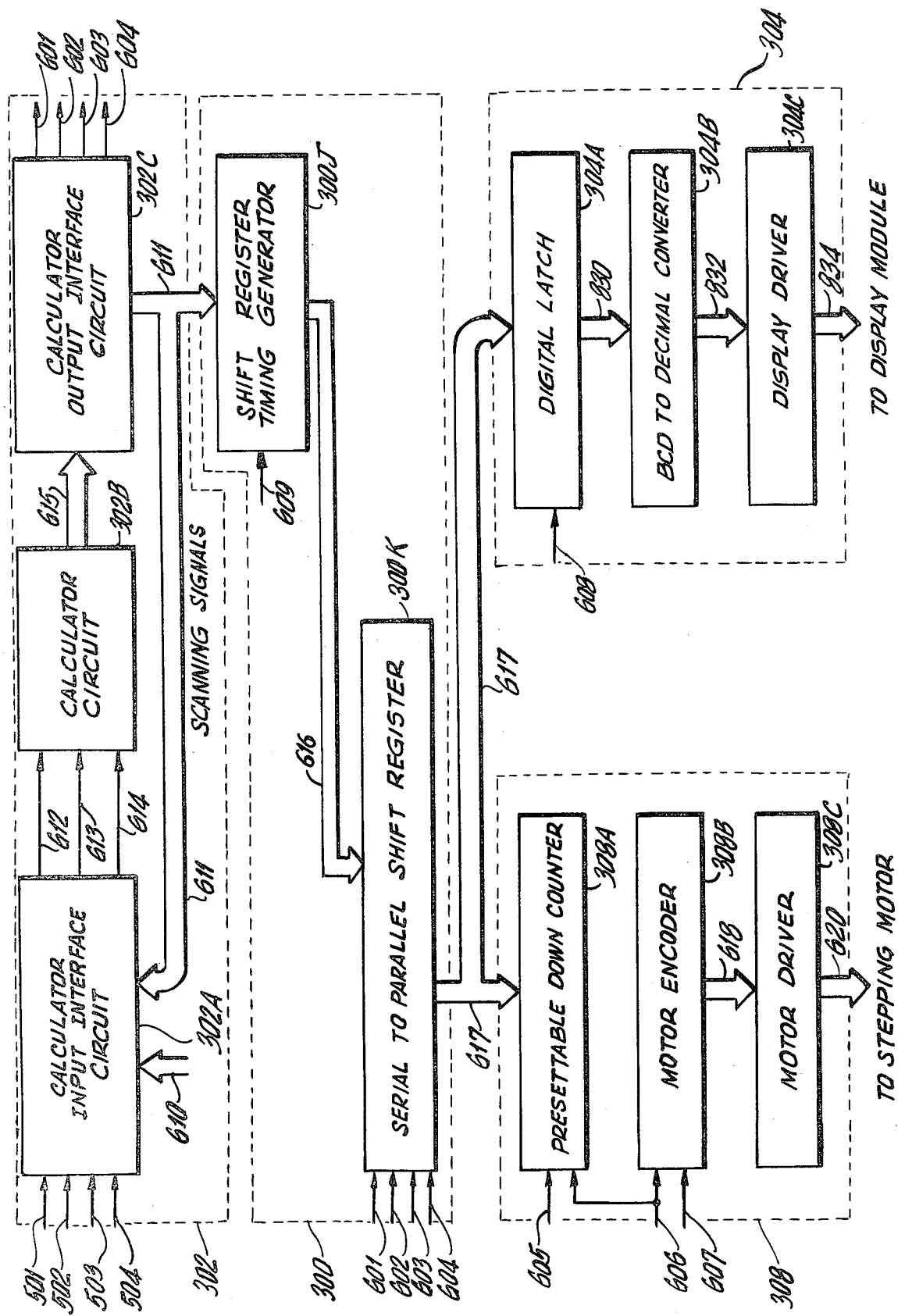

FIG. 9(a), 9(b) and 9(c) are schematic views further illustrating the electrical operation involved in the apparatus of the present invention.

Figure 1:
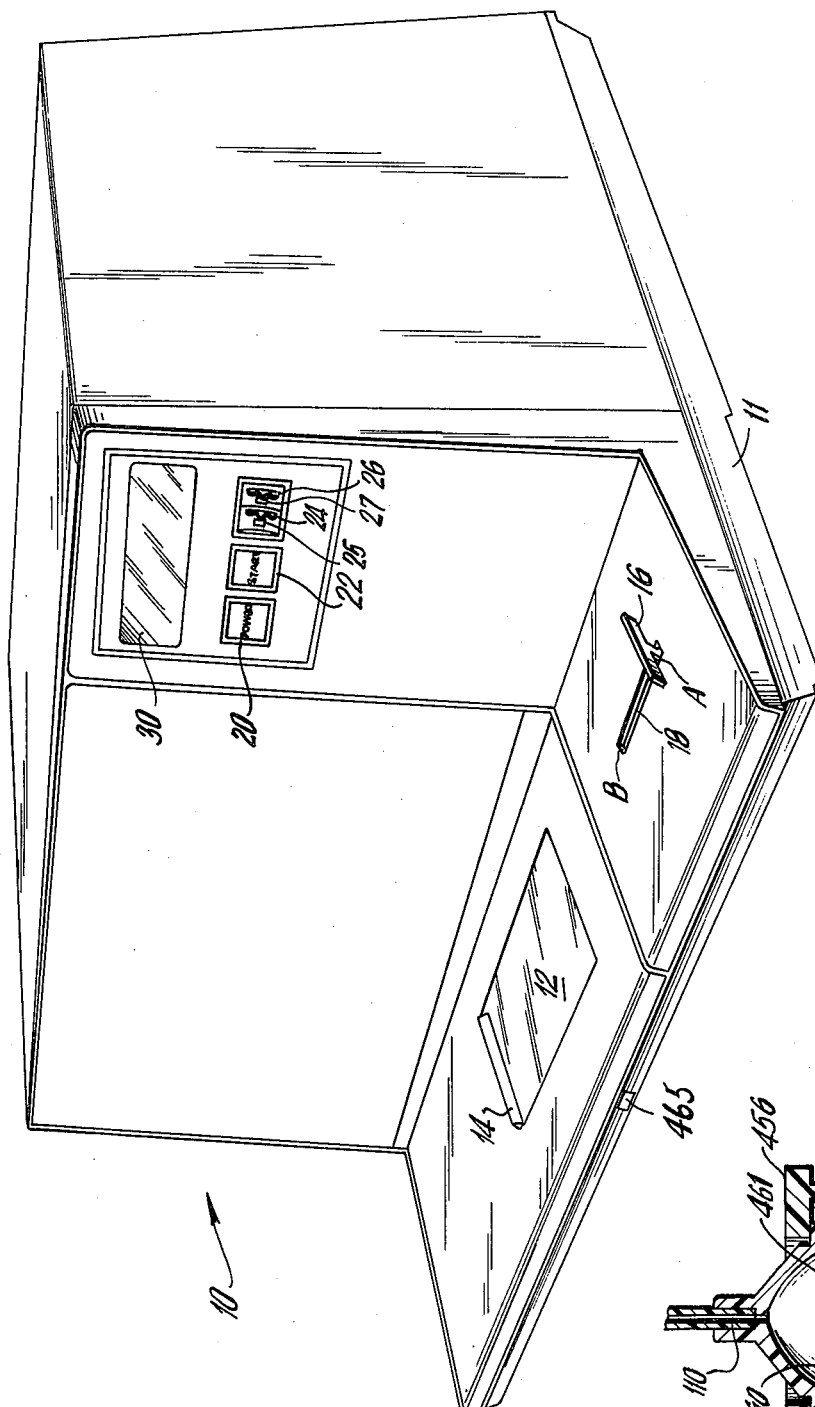
Figure 3:
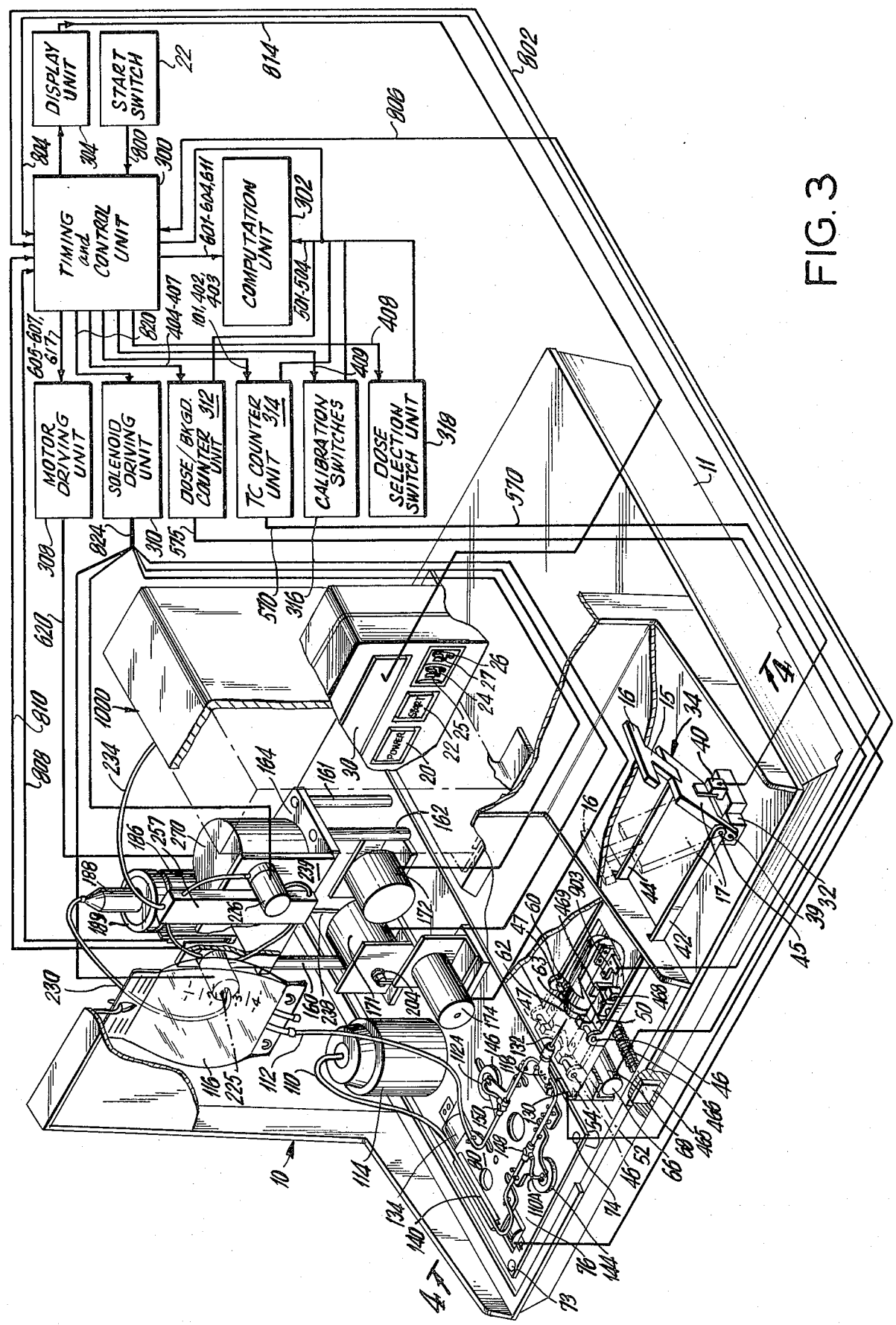
FIG. 3 shows, in perspective, mechanical components of the apparatus of the present invention involved in automatically measuring, diluting and dispensing a radioactive solution, such as technetium, at a preselected volume and dose concentration, in conjunction with associated electrical connections.

With reference to the drawings, FIG. 1 and 3 in particular, and the automated dispenser for a radioactive solution shown therein, there is illustrated enclosed housing assembly 10 mounted on base casting 11, the assembly 10 having sliding panel 12 and operating handle 16. Handle 16 may be moved between positions A and B within slot 18. Sliding panel 12 may be opened by the application of force on handle section 14, whereupon the panel 12 slides into the assembly 10.

When the sliding panel 12 is open, a receptacle preferably optically transparent and capable of receiving a preselected volume of a radioactive solution may be placed into assembly 10 through the opening onto a saddle block 50. When the sliding panel 12 is in a closed position, operation of the automatic dispenser for radioactive solutions may commence. For purposes of viewing the dispensing of the preselected volume and concentration of radioactive solution while minimizing radiation exposure to the viewer, at least part of the sliding panel 12 should comprise lead glass or the like. Such a lead glass panel 12 provides shielding against radiation and a viewing section into the assembly 10 during operation. Moreover, the function of such a glass viewing section is to permit observation of dispensing action to the receptacle. In this manner, the receptacle may be checked for signs of discoloration or particles inside of it. A light source to assist observation may be employed, if desired.

In the operation of the apparatus of the present invention, with reference to FIGS. 1 and 3, power button switch 20 is energized completing a conventional switch contact (not shown) which applies alternating current power to a conventional direct current power supply 1000. A suitable direct current power supply may comprise, for example, 24 volts direct current unregulated at 3 amperes, 5 volts regulated at 3 amperes, 12 volts direct current regulated at ½ ampere and 900 volts regulated at 1 milliampere. Depending upon design, different direct current power supplies could, of course, be employed. The direct current voltages provided by the direct current power supply are employed in the operation of various switches, electrical components and related devices described in the FIGS. 3, 9(a), 9(b) and 9(c).

Upon activation of direct current power, a conventional initialization circuit such as a power on reset circuit is activated. The circuit delivers a single pulse after supply voltage is turned on. The pulse is used to initialize timing and control unit 300. Upon initialization, the idle state functions in the timing and control unit 300 begin to operate.

The timing and control unit 300 is initially set to a predetermined starting point and upon initialization, will self-start to succeeding program steps. In stepping through its programmed sequence of operation, the timing and control unit 300 causes the background radiation to be counted by the background counter unit 312, as further described hereinafter. Moreover, the timing and control unit 300 causes the radioactive source detector 134 to monitor the activity of the radioactive source contained in capillary tube 140. The information so monitored is gathered by a conventional digital counter 314B and stored in a digital latch 314C as described more fully hereinafter. Geiger detector 134 is employed to measure the radioactivity of a radioactive source, such as technetium, in capillary tube 140 and geiger detector 66 is employed to measure the background radioactivity in assembly 10. Both geiger detector outputs are counted for predetermined time intervals, generally in the order of minutes and preferably in the order of seconds. A message such as WAIT may be displayed in the display window 30 as this counting takes place. During this time, the computation unit 302 is calculating the activity of the radioactive source At the end of the predetermined time intervals, the wait message is removed from the display window 30 by the timing and control unit 300 and the computed activity of the radioactive source is displayed in suitable units such as mCi/ml. Measurement and computation steps continue continuously while the assembly 10 is in the idle state. The calculation of the radioactivity is repeated continuously so that the decay rate of the radioactive source such as technetium-99mm may be monitored. This enables the maximum dose obtainable to be calculated.

Operating procedure involves the opening of sliding panel 12 by means of handle 14 and the placing of a receiving vessel onto saddle block 50 which is situated beneath sliding panel 12. In order to minimize radiation exposure to the user, the dose receiving vessel 60 is covered by an outer shielding 64 which comprises a lead shroud, receiving vessel or the like. For purposes of illustration only, the receiving vessel of this invention will be described with respect to a glass vial 60 contained in a lead cylindrical housing 64. The form of the receiving vessel is not intended to limit the scope of this invention and other receiving vessel capable of holding a dose of radioactive solution, such as a hypodermic syringe or the like could also be employed according to the invention. As stated hereinabove, the (lead glass) sliding panel 12 is opened and a shielded vial placed onto saddle block 50. The shielded dose vial 60 may contain a suitable lypholized reagent which is organ-specific or the like.

Figure 4:
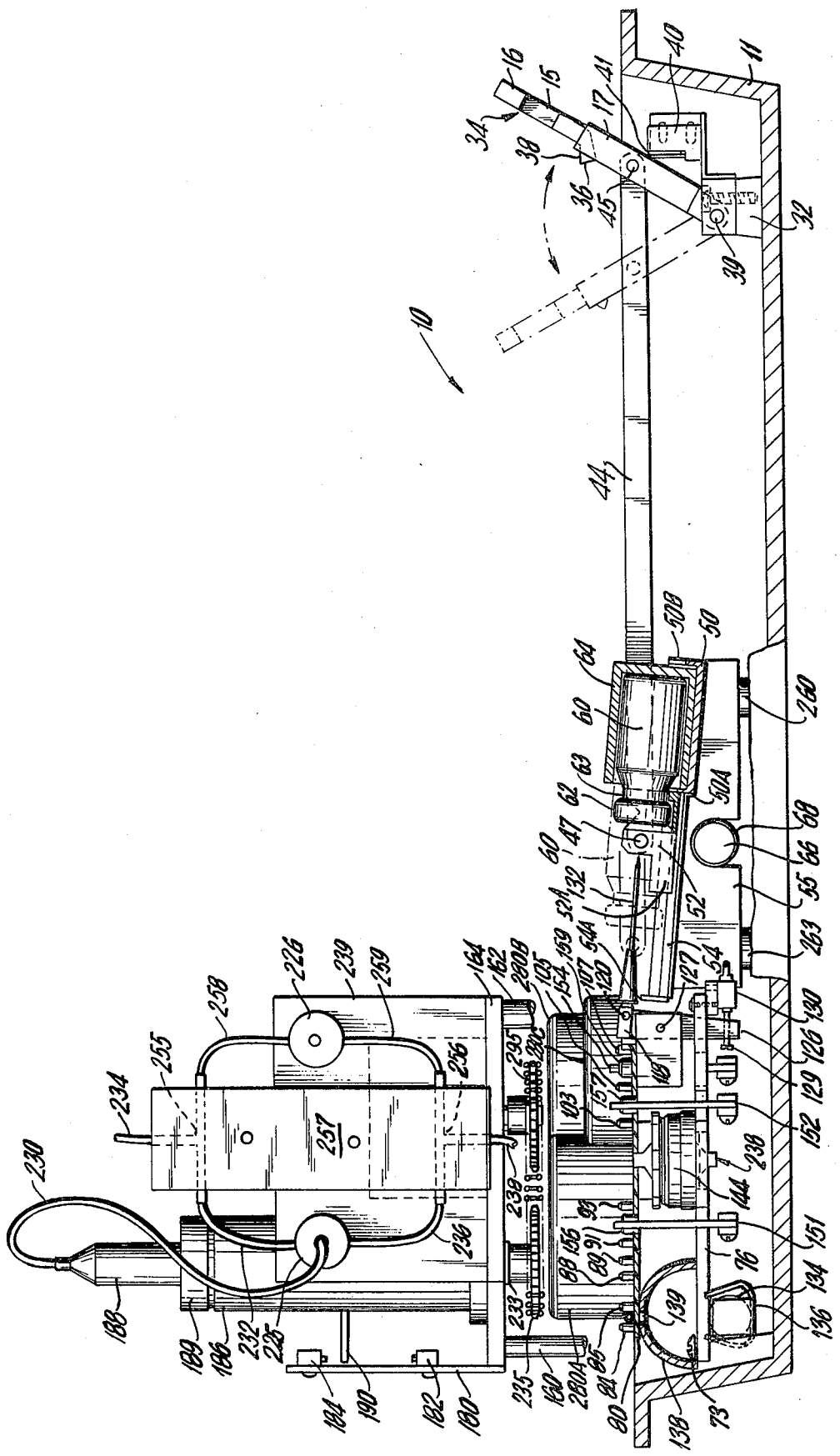
FIG. 4 shows a side elevational cross-sectional view of the assembly of FIG. 3 taken along line 4 — 4.

The present invention will be more fully understood by reference to FIGS. 3 and 4 wherein there is illustrated the mechanism for moving the dose vial 60 into position for receiving the radioactive dose volume. There is illustrated base casting 11 having base block 32 secured thereon. Operating lever 34 which comprises an operating handle 16, shaft 15 and flange 36 is fastened to base leg 17 and coaxially aligned therewith by means of screw 38 placed in flange 36 and leg 17. Base leg 17 is pivotly mounted on base block 32 via pivot pin 39 allowing operating handle 16 of operating lever 34 and base leg 17 to be moved between first and second predetermined positions corresponding to the positions of A and B at opposite ends of slot 18 in the front panel of assembly 10. When the operating lever 34 is in the first position (operating handle 16 at the A end of slot 18), the base leg 17 is in contact with lever 41 which triggers vial return sense switch 40 as described more fully hereinafter. When the operating lever 34 is in the second position (operating handle 16 at the B end of slot 18), the base leg 17 no longer contacts lever 41. Operating lever 34 may, of course, comprise one integral section instead of the sectional lever described herein.

Operating links 42 and 44 connect vial yoke 52 and operating lever 34. Pin 45 fastens one end of links 42 and 44 to base leg 17 and pins 46 and 47 fasten the other end of links 42 and 44, respectively, to vial yoke 52. Yoke 52 rests on ramp 54 which in turn rests on ramp support 55. Mounting bases 260 – 263 are used to support ramp support 55. Ramp 54 is inclined from the horizontal between about 0° and about 90° preferably between about 4° and about 10°. The object of such an inclined ramp is to permit liquid to accumulate at the bottom portion of vial 60 on ramp. The radioactive liquid to be measured is thus caused to collect at the lower end of vial 60 on the ramp which permits reproducible geiger detector measurements to be taken. In the first position of lever 34, saddle block 50 and yoke 52 are in an abutting relationship with one another so that when the shielded vial is placed onto saddle block 50, the top of the vial 60 rests within yoke 52.

Dose vial 60 having cap 62 and inwardly recessed neck 63 is shown as situated within shield container 64. Vial shield 64 in turn rests within a mating groove in saddle block 50, the mating fit designed to prevent movement of the shield container in a plane parallel to the incline of ramp 54. However, cap 62 of the dose vial 60 sets within a recess in yoke 52 forming a mating fit that allows the vial 60 to be moved in such a plane. A receiving vessel suitable for use in this invention should be designed to fit within a mating groove in saddle block 50 and engage yoke 52 so that it may be removed from the shield container and moved along the ramp 54 toward the dispensing area. For example, the top of receiving vessel 60 may lack a cap but its mouth may be wider than its neck so that its mouth fits within yoke 52 as described herein. Or receiving vessel 60 may have a suitable cap which not only may be penetrated by needle 132 as described herein, but also has a width suitable for resing within yoke 52.

Indeed, as the operating lever 34 is moved from the first position to the second position, the base leg 17 disengages from sensing lever 41. Moreover, the movement of operating lever 34 translates its movement via connected operating links 42 and 44 to yoke 52 within which cap 62 of dose vial 60 rests. The movement of operating lever 34 from the first to the second position therefore brings about a translinear movement of yoke 52 and hence dose vial 60 for a predetermined distance along ramp 54. The contact between the front end, sections 52A of yoke 52 with ramp flange 54A limits any further movement of yoke 52 along ramp 54 toward the hypodermic needle 132. The direction of movement of yoke 52 and vial 60 follows the direction of movement of the operating lever 34, but should always be toward the dose dispensing area as described hereinafter. Since saddle block 50 holds vial shield container 64 in place on the saddle block 50 via saddle block flanges 50A and 50B, the movement of dose vial 60 in the direction of the dose dispensing area partially removes it from shield container 64.

Figure 5:
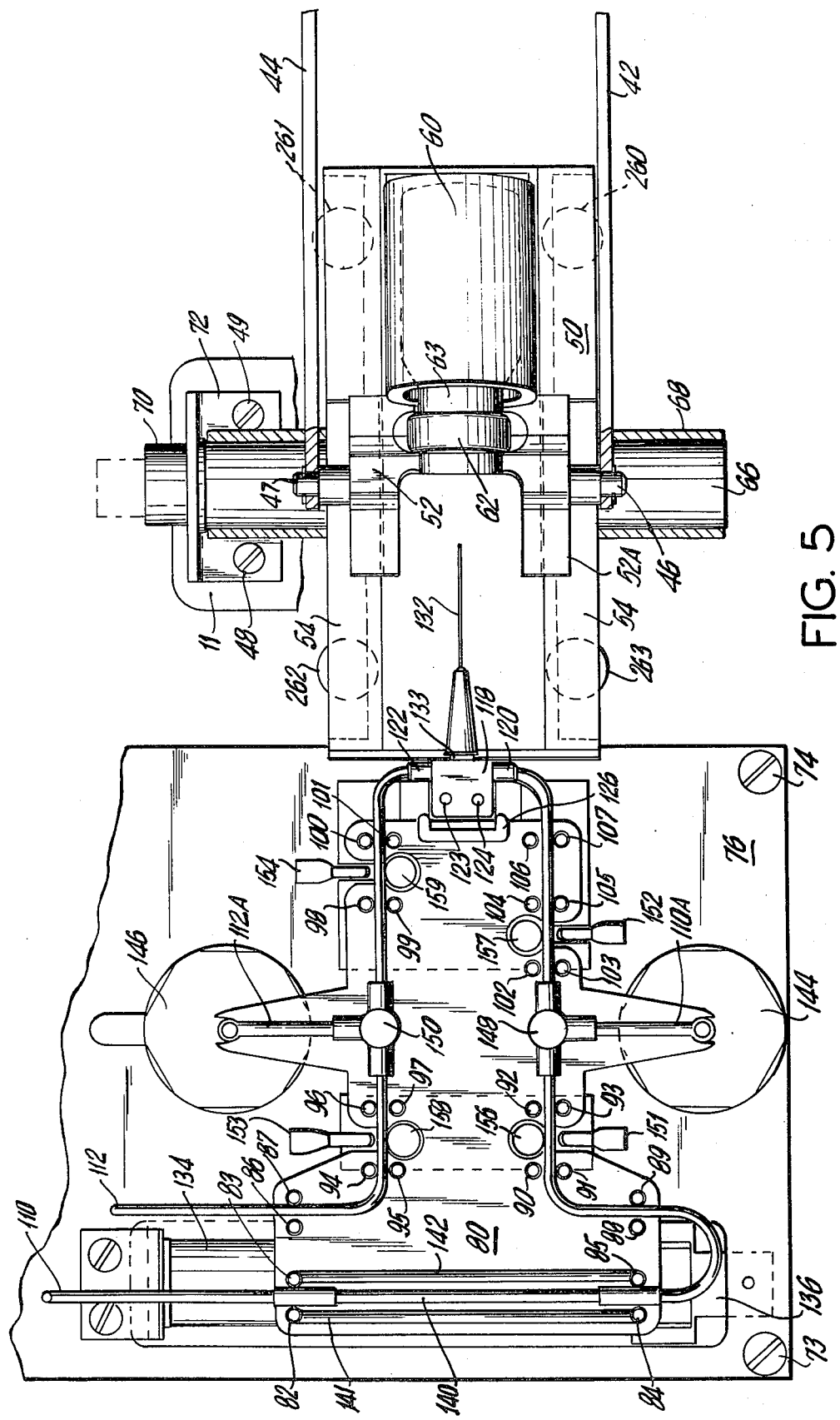
FIG. 5 shows a partial plan view of the assembly of FIG. 3.

With particular reference to FIGS. 3, 4 and 5, there is shown geiger tube 66 and shield 68 extending through two ramp supports 55. Flange 72 suppots socket 70 into which the geiger tube 66 is inserted in order to provide an electrical connection for geiger tube 66. Screws 48 and 49 are employed to secure flange 72 to base casting 11.

Screws 73 and 74 are illustrated as a means to mount mounting plate 76 to base casting 11. Cartridge 80 is a flat plate roughly rectangular in shape having posts 82–107 protruding from the upper surface thereof. The posts 82–107 are spaced apart in a predetermined pattern defining at least two adjacent paths for fluid flow. Tube 110 is positioned with one path and tube 112 is positioned in the other path. Tubes 110 and 112 are held in place primarily by friction between the tubes and the posts they fit snugly between. Tube 110 communicates at one end with the radioactive source container 114 and with needle block 118 at the other end. Tube 112 communicates with a saline supply container 116 at one end and with needle block 118 at the other end.

Needle block 118 has inlets 120 and 122 in the sides thereof for communicating with tubes 110 and 112, respectively. Pins 123 and 124 through the top lateral face of the needle block 118 are employed to secure needle block 118 to the cartridge and switch arm 126. Switch arm 126 is rotatably mounted via pivot pin 127 so that when pressure is applied in a substantially horizontal direction by needle block 118, switch arm 126 moves to a predetermined position in contact with vial sense switch 130. Screw 129 through switch arm 126 is used to make adjustments if required, so that the desired contact for the vial sense switch 130 may be produced according to the pressure exerted on the needle block 118.

Hypodermic needle 132 is mounted to needle block 118 and communicates therewith by means of a press-on or screw-on fit 133 in a mating outlet recess in the end face of needle block 118. When operating lever 34 is moved from the first position to the second position thereby advancing dose vial 60 as described hereinabove, hypodermic needle 132 enters the mouth of dose vial 60 and extends thereinto. The pressure exerted on needle block 118 by the cap 62 which is pierced by needle 132 in turn moves switch arm 126 into contact with vial sense switch 130. Where the vias has no cap, pressure on needle block 118 may be supplied by contact with a suitable device, e.g., a bar extending from yoke 52 into contact with needle block 118 when the needle 132 has entered vial 60.

Geiger detector 134 held in mounting clip 136 is positioned below cartridge 80 so that glass capillary tube 140 having a controlled inside diameter is situated above the geiger counter 134 in proximity thereto. A shielding shroud 138 is interposed between geiger detector 134 and the capillary tube 140 to limit exposure of the geiger detector 134 through an opening 139 in the shielding shroud 138 to the radioactive source passing through capillary tube 140. Capillary tube 140 is flanked on both sides by protruding rectangular sections 141 and 142 which provide a protective barrier for the fragile capillary tube 140. Sections 141 and 142 may be secured to cartridge 80, molded into it or the like.

Capillary tube 140 may comprise metals, plastic, but preferably comprises glass. The material that comprises capillary tube 140 should be non-reactive to the liquids utilized and capable of transmitting radiation without significant reduction thereof. The combination of capillary tube 140 and shielding shroud 138 provide a means of obtaining precise and reproducable measurements by detector 134. Capillary tube 140 provides a known reproducible diameter and shroud shielding 138 masks all extraneous radiation permitting only radiation from capillary 140 to pass through a slot 139 to be measured by detector 134 the slot having known dimensions. Preferably capillary tube 140 is cylindrically shaped, its axis is parallel to and in the same plane as the geiger tube 134 and slot 139 which also have parallel axes, and is spaced apart a predetermined distance from slot 139 and detector 134.

Diaphragm assemblies 144 and 146 are connected to three-way connectors 148 and 150 via tube sections 110A and 112A, respectively. Tubes 110 and 112 are connected to three-way connectors 148 and 150, respectively, so that diaphragm assemblies 144 and 146 may communicate with tubes 110 and 112, respectively, via tube sections 110A and 112A, respectively. Pinch valves 151, 152, 153 and 154 as well as their corresponding posts 156, 157, 158 and 159, respectively, are illustrated in FIG. 5. In the open position, the pinch valves 151–154 do not apply pressure on tubes 110 and 112 and generally are not in contact with tubes 110 and 112. In the closed position, the pinch valve presses the tubing between it and its corresponding post against the post whereby the flow path in the tubing is shut off. Pinch valves 151 and 153 for purposes of illustration are shown as operating in reciprocal relationship with one another. When pinch valve 151 is in the open position allowing flow through tubing 110, pinch valve 153 is in the closed position shutting off the flow path in tubing 112.

Figure 6:
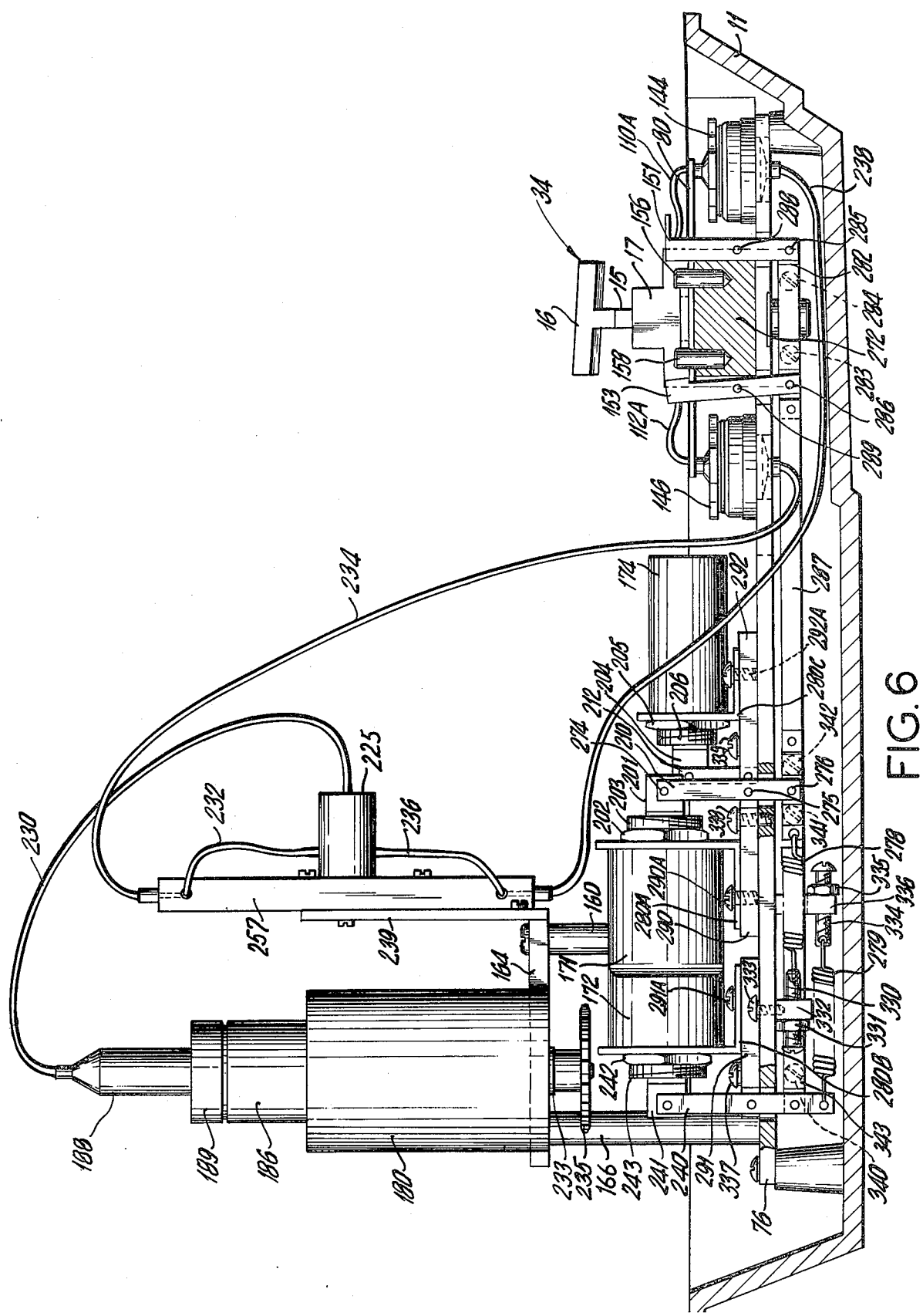
FIG. 6 shows an end elevational cross-sectional view of the assembly of FIG. 3 looking into the left end of the assembly.

With reference to FIGS. 3, 4 and 6, posts 160, 161, 162 and 166 hold up the motor and syringe assembly through mounting plate 164. Attached to the assembly mounting plate 164 is valve mounting plate 239 to which are secured three-way valve 225, two-way valve 226 and distribution block 257. Syringe barrel 188 communicates through flexible tubing 230 with three-way valve 225. Three-way valve 225 is capable of communicating with tubing 234 and 238 through tubing sections 232 and 236, respectively. Tubing 232 and 236 communicate on one end with three-way valve 225 and with tubing 234 and 238, respectively at the other end through tees 255 and 256, respectively, which tees are situated in fluid distribution block 157. Two-way valve 226 is capable of communicating with tubing 234 and 238 through tubing sections 258 and 259, respectively. Tubing 258 and 259 communicate at one end with two-way valve 226 and with tubing 234 and 238, respectively, at the other end, through tees 255 and 256, respectively.

Pinch valve solenoid 171 operates pinch valves 151 and 153. Pinch valve solenoids 172 and 174 are employed to operate pinch valves 152 and 154, respectively. Also illustrated are solenoid armatures 201, 241 and 204, solenoid linkages 210, 240 and 212; solenoid nuts 202, 242 and 205 and the threaded portion thereof 203, 243 and 206 which correspond to their respective solenoids 171, 172 and 174. Solenoid mounting flanges 280A, 280B and 280 C support solenoids 171, 172 and 174, respectively, and are attached to pivot blocks 290, 291 and 292, respectively. Screws 290A, 291A and 292A are employed to secure the respective solenoid flanges to pivot blocks 290, 291 and 292.

Attached to the assembly mounting plate 164 is a further mounting plate 180 to which are secured fill limit switch 182 and empty limit switch 184. Protruding from the pump assembly 186 and syringe barrel 188 having threaded cap 189 is a bar 190 which activates switches 184 and 182 by contact as the piston of the pump assembly 186 rises and descends during operation as described more fully hereinafter. Drive linkage from the pump and step motor assembly comprises sprockets 235 and 295 connected by a suitable pitch chain (not shown). Sprocket 235 is mounted on the shaft within bushing 233 (not shown) which shaft is part of the pump assembly 186.

With reference to FIG. 6, solenoid 171 is connected with pinch valves 151 and 153 via armature 201, link arm 210, and link arm 287. Link arm 210 is connected at one end with armature 201 by means of pivot pin 274. The opposite end of link arm 210 is connected to one end of link arm 287 by means of pivot pin 276. Link arm 210 is permitted limited rotation about pivot pin 275 which in turn is mounted in pivot block 290 through link arm 210. The other end of link arm 287 is connected to link arm 282 by means of screws 283 and 284. Pinch valves 151 and 153 are connected to link arm 282 through pivot pins 285 and 286, respectively. Pinch valves 151 and 153 are permitted limited rotation about pivot pins 288 and 289, respectively, which pins are mounted through pinch valves 151 and 153 into block 272.

Spring 278 is connected at one end to link arm 287 and at the other end to screw 330 by means of hooks which attach to holes within link arm 287 and screw 330. Nut 331 is threaded on screw 330 and is used to adjust the tension of spring 378 by adjusting the extension of screw 330 through block 332. Block 332 is mounted to plate 76 by means of screw 33.

In the operation of the apparatus of this invention, when solenoid 171 is energized, armature 201 is drawn into the solenoid by a magnetic force. The movement of armature 201 is translated to pinch valves 151 and 153 through link arms 210, 287 and 282. By the withdrawal of armature 201 into solenoid 171, pinch valve 151 is caused to close toward post 156 pinching off flow through tubing situated between post 156 and valve 151. Simultaneously, pinch valve 153 is caused to open and move away from post 158 permitting flow through tubing situated between post 158 and valve 153.

When solenoid 171 is de-energized armature 201 is permitted to leave the solenoid and return to its original position. Spring 278 provides the tension force through link arms 287 and 282 which causes pinch valves 151 and 153 to return to their initial position wherein pinch valve 151 is open and pinch valve 153 is closed. Solenoids 172 and 174, their corresponding armatures, link arms, springs and pinch valves are joined and operated in a manner similar to that of solenoid 171 described hereinabove. Illustrated in FIG. 6 are solenoids 172 and 174, their corresponding armatures 241 and 204, link arms 240 and 212, spring 279 of solenoid 172, screw 334 attached to spring 279, nut 335 threaded on screw 334 and block 336 through which screw 334 extends. Pivot blocks 290, 291 and 292 are mounted to plate 76 by means of screws 338, 337 and 339, respectively. Screws 340, 341 and 342 are used to reinforce the ends of link arms 287 (solenoid 171) and 343 (solenoid 172.

Referring to FIGS. 3, 4 and 6, there is shown stepping motor 270, pump assembly 186, syringe barrel 188 having threaded cap 189, sprockets 235 and 295, bar 90 extending from pump assembly 186. Conventional stepping motor 270 is coupled to conventional pump assembly 186 through sprockets 235 amd 295 and a suitable pitch chain (not shown) coupling the sprockets together. Pump assembly contains a plunger (not shown) which extends through cap 189 into syringe barrel 188. Through operation of pump assembly 186, the plunger moves up or down in syringe barrel 188 depending on the direction of a stepping motor shaft (not shown) attached to sprocket 295.

Diaphragm assemblies 144 and 146 provide an easily disposable device which ensures the use of sterile components in the apparatus of this invention. Tubings 234 and 238 communicates at one end with fluid distribution block 257 and at the other end with the lower portions of diaphragm assemblies 146 and 144, respectively. As described hereinabove, tubings 110 and 112 communicate with the upper portions of diaphragm assemblies 144 and 146, respectively.

Figure 2:
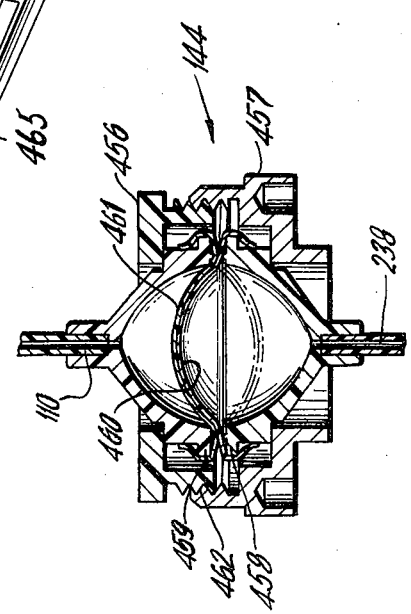
FIG 2 shows a side cross-sectional view of a diaphragm assembly employed in the apparatus of the present invention.

With particular reference to FIG. 2, illustrated therein is diaphragm assembly 144. Diaphragm assembly 144 comprises upper and lower housing sections 456 and 457, cup-shaped support members 458 and 459 within the housing and elastic membranes 460 and 461 covering the mouth of support members 458 and 459, respectively. Upper and lower housing sections 456 and 457 are joined together by a screw fit 462 and preferably are cylindrically shaped. Support members 458 and 459 are coaxially aligned with their mouths interfacing bringing the outer surfaces of membranes 460 and 461 into contact with one another. Although support members 458 and 459 are shown as having a cup-shaped configuration, other shapes may be employed provided that their inner volume contains a cavity whose dimensions permit the membranes to fully extend therein as described hereinafter.

Membranes 460 and 461 are caused to harmoniously move together as one while maintaining full contact between their interfacing surfaces. As shown in FIG. 2, membranes 460 and 461 are in a first position wherein both membranes extend a first predetermined distance into the cavity of support member 459. During the operation of the apparatus of this invention, membranes 460 and 461 are caused to move into a second position wherein both membranes extend a second predetermined distance into the cavity of support member 458. The first and second predetermined distances are established by the computation unit 302 as described hereinafter. In traversing from the first membrane position to the second membrane position, the increase in volume within the cavity of support member 459 is essentially equal to the decrease in volume within the cavity of support member 458. Suitable material for membranes 460 and 461 may comprise an elastic material which is impervious to and unaffected by the fluids to be employed as described herein. The material should maintain is elasticity between the first and second membrane positions. Diaphragm assembly 146 is identical to assembly 144 in structure and function.

Figure 7:
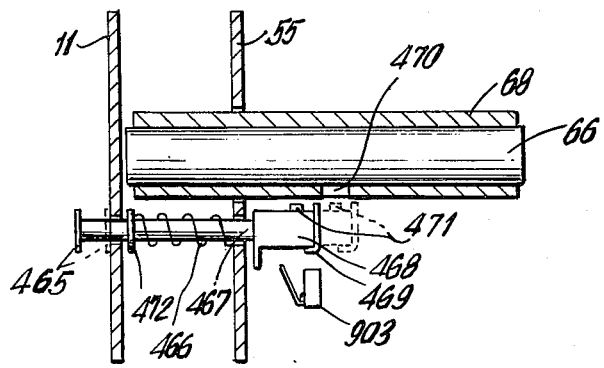
FIG. 7 shows a partial plan view in some detail of the checksource mechanism involved in the operation of apparatus of a preferred embodiment of the present invention.

With reference to FIG. 7, shown therein are base casting 11, geiger detector 66, shielding member 68 having opening 470 therein, push button 465, push arm 467, spring 466 wound around arm 467, retaining clip 472 attached to arm 467, a radioactive checksource 471, block 468, shielding member 469, switch 903 and ramp support 55. Push button 465 is attached to the end of push arm 467 extending through a hole in base casting 11. The other end of push arm 467 extends through a hole in ramp support 55 and is attached to block 468.

Checksource 471 is mounted on block 468 which may be moved parallel to the axis of geiger detector 66 from a first predetermined position into a second predetermined position which is in proximity with the opening 470 within shielding 68. Hence, movement of block 468 into such a second predetermined position brings checksource 471, which is interposed between block 468 and opening 470, into proximity of opening 470. Geiger detector 66 measures radioactivity eminating from the checksource 471 through opening 470 within shielding 68. Push button 465 may be moved so as to cause push arm 467 and block 468 to reach the second predetermined block position.

When block 468 reaches the second predetermined block position, block 468 contacts sensing switch 903 causing it to become activated as more fully described hereinafter. Spring 466 becomes compressed between retaining clip 472 and ramp support 55 when push button 465, arm 467 and block 468 are in the second predetermined position. Upon release of push button 465, the restoring force of spring 466 causes push button 465, push arm 467 and block 468 to return to the first predetermined position. In the first predetermined position, block 468 does not contact sensing switch 903, radioactive checksource 471 is removed from opening 470 and radiation from checksource 471 is blocked from opening 470 by shielding members 68 and 469.

Checksource button 465 may be pressed prior to dispensing, if desired, to move a long-life source 471 of low known radioactivity into place near the dose geiger tube 66. The geiger tube 66 then measures the activity of the checksource 471 and the display units of radioactivity are then computed. At the same time, a message indicating that the check source is being used may be displayed in display panel 30 of the assembly 10. Upon release of pressure on check source button 465, the timing and control unit 300 returns to its idle state and the radioactive checksource 471 returns to a shielded position as described hereinbefore. The checksource may be manually operated by push button 465 or mechanically operated by the use of solenoids or the like.

The operation of the apparatus and method of this invention will be more fully understood by reference to the description in conjunction with the drawings. Sliding panel 12 is opened and the shielded dose vial 60 is placed onto saddle block 50 as described hereinabove. Sliding panel 12 may then be closed. Operating handle 16 which projects outside of assembly 10 through slot 18 is moved from a first position denoted as A at one end of slot 18 to a second position denoted as B at the other end of slot 18. This in turn moves operating links 42 and 44 and hence yoke 52 along ramp 54 towards hypodermic needle 132. The cap 62 of dose vial 60 rests within yoke 52 and vial 60 is impaled on the needle 132. The needle 132 and longitudinal axis of vial 60 are coaxially aligned. When the cap 62 is penetrated by needle 132, the force of contact pushes needle 132 backward as cap 62 is impaled on the needle 132.

Figure 4A:
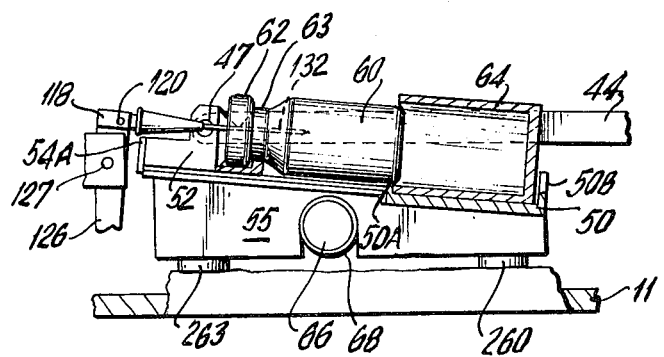
FIG. 4(a) shows the positions taken by certain portions of the apparatus of the present invention during operation involving the dispensing of radioactive solution and saline solution into the dose receptacle.

As described hereinabove, hypodermic needle 132 is connected to needle block 118 which is mounted on switch arm 126 via pins 123 and 124. Switch arm 126 pivots as needle 132 moves linearly backward until switch arm 126 contacts vial sense switch 130. Sense switch 130 thus senses the presence of vial 60 and needle 132 in mating position as shown in FIG. 4(a) without having to sense each separately in such position. This procedure is used to conveniently maintain sterility of needle 132 and vial 60. Furthermore, start button 22 is disabled by the timing and control unit 300 until vial 60 and needle 132 mating contact is sensed by switch 130. This prevents dispensing (or spilling) liquid such as saline or technetium or the like in the absence of such mating contact of vial 60 and needle 132.

The desired dose may be selected by manual operation of thumbwheel switches 24 and 26 as shown in FIGS. 1 and 3 which switches operate ten's and unit's digits 25 and 27, respectively (and readout display 30). Thumbwheel switches 24 and 26 function by storing information in conventional binary type code in the switches. All information stored in the switches is presented to computation unit 302 by timing and control unit 300 at specific points in the program through the use of conventional threestate buffers as more fully described hereinafter.

As described hereinabove, start button 22 may be activated when the dose vial 60 and needle 132 are in mating contact. Upon activation of the start button 22, timing and control unit 300 is forced into that portion of its stored program which causes computation unit to calculate a number of motor steps required to pick up a volume of concentrated radioactive solution such as technetium and dispense it into dose vial 60 according to the algorithm:

$$Tc \text{ motor steps} = \frac{K_1(\text{selected dose})}{Tc \text{ counts}} - K_2(\text{selected dose})$$

wherein Tc motor steps are the number of pulses applied to the stepping motor 270 by motor driving unit 30 such that the volume displaced in syringe barrel 188 by the plunger therein corresponds to the volume of technetium solution required to deliver the selected dose concentration; $K_1$ and $K_2$ are calibration constants which may be empirically derived during calibration of the apparatus of the instant invention; the selected dose corresponds to the setting of the thumbwheel switches and Tc counts is the number stored in digital latch 314C as more fully described hereinafter.

The timing and control unit 300 causes the number of steps computed by computation unit 302 to be applied to the motor controller unit 308 which then causes stepping motor 270 to turn in a direction which causes the syringe barrel 188 to fill. In order to prevent contamination of the syringe barrel 188, a diaphragm interface is employed to maintain the complete separation of the working fluid in the syringe barrel 188 from the saline and technetium fluids while in the fluid dispensing path. Furthermore, this concept permits not only the needle block, needle, and the upper portion of the diaphragm assemblies which handle the saline and technetium solutions to be disposable but also permits the tubings 110 and 112 for the dispensing fluid path to handle only saline and technetium fluids and be disposable so that sterility is more easily maintained.

Solenoid driving unit 310 operates the solenoids 171, 172, 174 and solenoid valves 225 and 226 so that the displaced volume of radioactive source fluid such as technetium is loaded into the cavity defined by support member 459 and membrane 461 of diaphragm assembly 144 as described hereinbelow. The timing and control unit 300 in conjunction with solenoid driving unit 310 operates solenoid valve 225 which selects preprogrammed fluid path 234 or 238 leading to technetium diaphragm assemblies 146 and 144, respectively. For purposes of illustration, when fluid path 238 is selected, the port to fluid path 234 is blocked off by a signal from solenoid driving unit 310 to solenoid valve 225.

It has been found that silicone fluid may be admirably employed in the tubings of this invention. Silicone prevents evaporation through the flexible tubing used in interconnection, has long life and hence does not need frequent replacement, and has the desirable lubricating characteristics of noncorrosiveness and a low viscosity to minimize fluid resistance in the tubing. Moreover, silicone is immiscible with water. Fluids other than silicone which may be employed are water or any low viscosity, non-corrosive liquid whose viscosity is no greater than about ten times that of water, and preferably no greater than about five times that of water.

The fluid path tubing 238 is connected to the bottom of diaphragm 144 as shown in FIG. 6. Initially, the piston within syringe barrel 188 is at a top position and during operation of the stepping motor 270 by motor driving unit 308 through timing and control unit 300, the piston within syringe barrel 188 moves downward. As the piston moves downward, there is an increase in volume within syringe barrel 188 and a corresponding decrease in volume within the cavity defined by support member 458 and membrane 460. The fluid, preferably silicone, which is situated within tubing 238 is incompressible and by well-known laws of physics, leaves the cavity defined by support member 458 and membrane 460 and enters syringe barrel 188. The flexible membrane 460 follows the exiting fluid to the second position as discussed hereinabove. Similarly, flexible membrane 461 follows flexible membrane 460. As a result, the volume within the cavity defined by support member 459 and membrane 461 increases which in turn causes a radioactive solution, such as technetium, to flow from the radioactive source supply 114 through tubing 110 into the cavity defined by support member 459 and membrane 461 through open pinch valve 151. Pinch valve 151 is initially open when operation of the apparatus of this invention commences. Radioactive source supply 114 is vented to the atmosphere.

At the end of piston motion the timing and control unit 300 through solenoid driving unit 310 and through solenoid 171 closes pinch valve 151, which opens complementary pinch valve 153. Solenoid driving unit 310 through solenoid 172 also opens pinch valve 152. The opening of pinch valve 152 opens the fluid unit 310 through solenoid 172 also opens pinch valve 152. The opening of pinch valve 152 opens the fluid path through line 110A from the diaphragm 144 to the needle 132 and closes the path through line 110A from the diaphragm 144 to the technetium source supply 114. The timing and control unit 300 through motor driving unit 308 operates the stepping motor 270 in an opposite direction so that the motor 270 can now turn in a direction to empty the syringe by upward motion of the piston. The direction of fluid flow as the piston moves upward within syringe barrel 188 is the opposite to that described hereinabove. As the piston moves upward, silicone fluid is forced to flow through tubing 238 into the cavity defined by support member 458 and membrane 460. In turn, membranes 460 and 461 return to their first position forcing radioactive technetium solution out of the cavity defined by support member 459 and membrane 461 through tube 110A and needle 132 into dose vial 60. The volume of technetium fluid forced out of the diaphragm assembly 144 is essentially equal to the volume of technetium fluid drawn from radioactive source supply 114 and is also essentially equal to the volume forced into dose vial 60. The number of motor steps is the same as for filling the syringe barrel 188.

The computation unit 302 controlled by timing and control unit 300 now computes the number of steps required to displace a volume of saline which, when added to the technetium solution already dispensed, will provide a preselected dose volume having a preselected concentration according to the following algorithm:

Total steps − Tc steps = Saline steps, wherein total steps are the number of motor steps that correspond to a total displaced fluid volume equal to the preselected dose volume; the Tc steps are the number of motor steps previously computed for transferring technetium solution according to the algorithm for computing the number of Tc steps; and saline steps are the number of motor steps required to displace a volume of saline which, when added to the technetium solution already dispensed will provide a preselected dose volume.

The timing and control unit 300 through the solenoid driving unit 310 switches solenoid valve 225 to the saline diaphragm assembly 146, through fluid path 234 in a manner of operation similar to that described hereinabove with respect to fluid path 238 and blocks off flow path 238. The valve 154 was closed by solenoid 174 prior to the transfer of technetium solution and valve 153 is opened by the solenoid 171 and the stepping motor 270 is operated so as to cause the syringe barrel 188 to fill. A volume of saline equivalent to the displaced volume of silicone is loaded from saline source 116 through lines 112 and 112A into the diaphragm assembly 146. The solenoids 171 and 174 are then operated to close valve 153 and open valve 154, respectively. When the stepping motor 270 causes the syringe barrel 188 to empty, the displaced saline in diaphragm assembly 146 enters the dose vial 60 through line 112A and through the needle 132.

When the cycle initiation switch 22 was operated the digital counter circuit 312B of the dose or background counter 312, which had been counting the background signal from the dose/background detector 66, was inhibited from further counting by a signal 405 from the timing and control unit 300. The timing and control unit 300 now permits pulses from the dose/background detector 66 which monitors radiaton from the dose vial 60 to be counted by digital counter circuit 312B of dose counter 312 for a fixed interval, typically in the order of seconds. A time period of about 10 seconds is preferred. At the end of this time interval, further counting is prevented by signal 405 of the timing and control unit 300. Thereafter, the computation unit 302 calculates the measured dose concentration, correcting for background activity. The computation unit 302 calculates the equivalent concentration of technetium in the dose vial according to to the formula:

$$A = \frac{K_3(N-B)}{1\ D(N-B)}$$

wherein A is the calculated dose activity; $K_3$ is a constant empirically determined during calibration of the apparatus; N is the number accumulated in digital counter circuit 312B at the end of the dose vial counting interval; B is the number stored in digital latch 312C and corresponds to background radiation in the apparatus; and D is a constant called dead time or recovery time and is a characteristic of Geiger-Muller counting tubes. This permits calculation of the equivalent activity in mCi/ml. After the computation, the resultant number is displayed in display area 30 of the assembly 10 along with a message indicating that the dose is ready.

The operating handle 34 is now returned manually to its first position which disengages the needle 132 and cap 62 and returns the vial 60 to its shield 64, thereby activating the vial return sense switch 40. Activation of the switch 40 causes the timing and control unit 300 to return to its idle state. The sliding panel 12 may then be opened and the shielded vial 60 removed for usage. The assembly 10 may be turned off by operating the power switch button 20 again, the switch being a conventional toggle switch, push button switch or the like.

Figure 8:
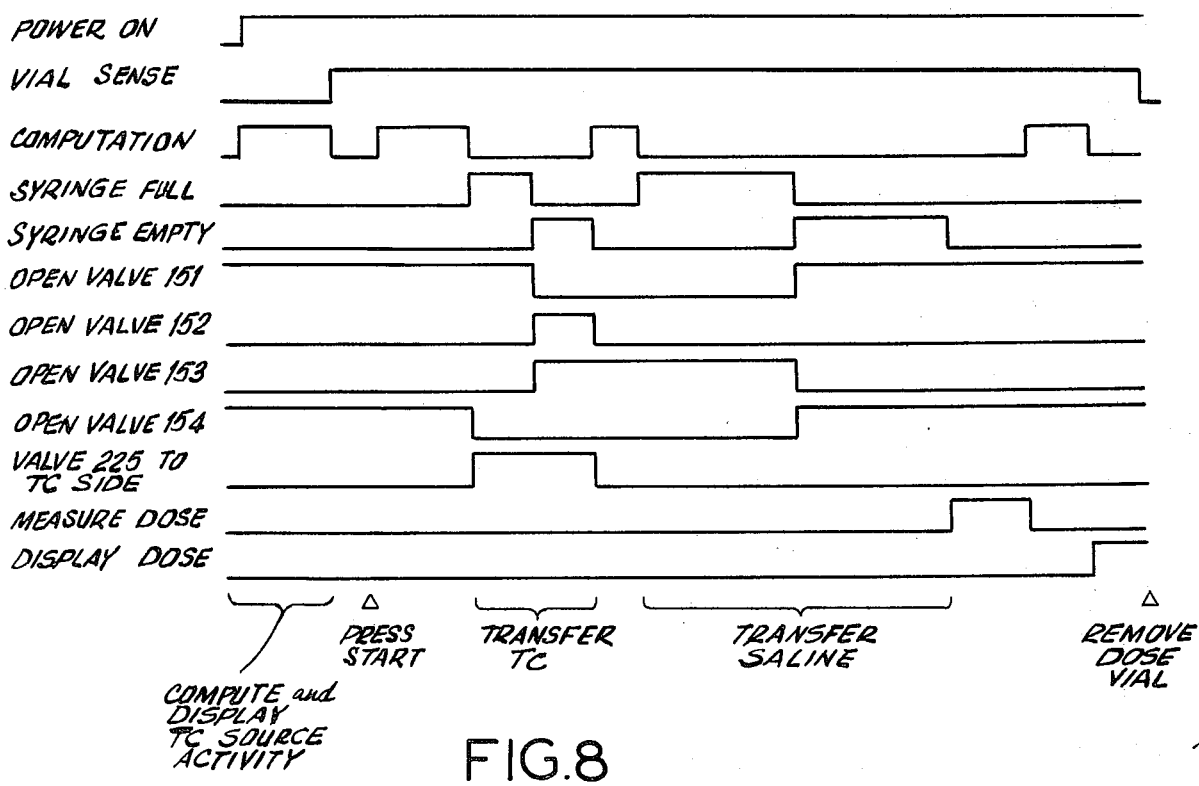
FIG. 8 is a timing chart correlating the operation of certain components of the apparatus illustrated in FIG. 3.

The foregoing operating sequence is exemplified in the timing diagram of FIG. 8. When power button 20 is energized, the timing and control unit 300 is set into its idle state. The shielded dose vial 60 is loaded into the apparatus as described more fully hereinabove. When properly loaded, a vial sense switch 130 permits the start button 22 to be energized. Activity of a radioactive technetium source, for example, is monitored, computed and displayed on the display module 30. Upon selection of the desired concentration on the control panel, the dispensing cycle is started by energizing the start button 22. The apparatus then computes the dilution ratio necessary to deliver the desired dose and the number of steps the stepping motor must go through to deliver the proper ratio of technetium and saline.

Valve 225 switches the flow path from the syringe barrel 188 to the diaphragm assembly 144 connected to the technetium side of the tubing. Valve 154 closes and the stepping motor 270 causes the syringe barrel 188 to fill. When filled, valve 151 is closed, valves 152 and 153 are opened, and the stepping motor 270 causes the syringe barrel 188 to empty causing technetium solution to flow from diaphragm assembly 144 through needle 132 into dose vial 60. Then valve 152 is closed and valve 225 switches to the flow path from the syringe barrel 188 to the diaphragm assembly 146 connected to the saline side of the tubing. The number of saline steps that the stepping motor 27 is to take is then computed. The syringe barrel 188 begins to fill causing diaphragm assembly 146 to fill with saline. When full, valve 151 opens and valve 153 closes; valve 154 opens and the syringe barrel empties causing saline to flow from diaphragm assembly 146 through needle 132 into dose vial 60. After the apparatus has brought about delivery of the desired dose in the shielded dose vial 60, the activity of the solution within dose vial 60 is measured and computed and the computed valve of the dose concentration is displayed. Removing the shielded dose vial 60 resets the apparatus to its idle state.

In the event that power is turned off during the operation of the apparatus of this invention and the piston within syringe barrel 188 is not in its initial position (its highest predetermined position in syringe barrel 188), operation stops. When power is restored, the apparatus is reset to its starting position by timing and control unit 300. Timing and control unit 300 through solenoid driving unit 310 energizes solenoid valve 226 and operates motor 270 through motor driving unit 308 so as to drive the plunger upwards to its initial position.

Bypass valve 226 is connected to distribution block 257 via tubing sections 258 and 259 and thereby communicates with tubings 234 and 238, respectively. As the plunger moves to its initial position, bypass valve permits fluid to be simultaneously distributed to diaphragm assemblies 144 and 146 through lines 234 and 238 respectively. The fluid flow path is from syringe barrel 188 through tubing 230 and through solenoid valve 225 into distribution block 257 via lines 232 or 236. From distribution block 257, the flow is permitted to pass through bypass valve 226 and lines 258 and 259 into both tubings 234 and 238.

When the piston reaches its initial position, the membranes within both diaphragm assemblies 144 and 146 also reach their initial position (in the upper cavity containing saline or technetium). Both diaphragm assemblies reach their initial position since the pressure distribution is equalized in the lines to both diaphragm assemblies by the action of bypass valve 226.

Stepping motor 270 causes the plunger in syringe barrel 188 to move to its initial position until bar 190 extending from syringe assembly 186 moves upward into contact with sense switch 184. The activation of sense switch 184 restores timing and control unit 300 via line 808 to its idle state. During the operation of the apparatus of this invention, when plunger within syringe barrel 188 moves downward, bar 190 correspondingly moves downward. If bar 190 contacts switch 182, the timing and control unit 300 via line 810 is triggered into reversing the stepping motor 270, reversing the movement of the plunger within syringe barrel 188 and preventing damage to syringe assembly 186. Ordinarily, the operation of the apparatus of this invention will not bring bar 190 into contact with switch 182.

Figure 4B:
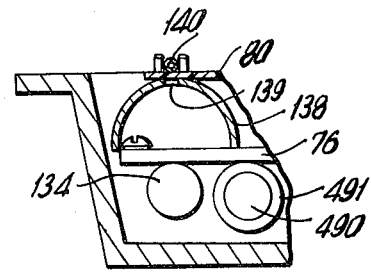
FIG. 4(b) shows a partial side cross-sectional view of another embodiment of the radioactive source detection apparatus of this invention shown in FIG. 4.

In a preferred embodiment of the apparatus of the subject invention, a molybdenum detector 490 as illustrated in FIG. 4(b) may be employed in addition to radiation source detector 134. Molybdenum detector 490 is at least partially enclosed within shielding member 491 so that higher energy radiation from molybdenum many be detected while lower energy radiation from the radioactive source employed in this invention is blocked from detector 490. Molybdenum detector 490 may be placed in the vicinity of detector 134 provided the two detectors do not interfere with the operation of each other and are exposed to radiation from the radioactive source through a slot 139. Also shown in FIG. 4(b) are mounting plate 76, shielding member 138, slot 139, capillary tube 140 and cartridge 80 as described hereinbefore. It may be desirable to employ a molybdenum detector to detect possible contamination of a technetium radioactive source by its parent, polybdenum.

Figure 4C:
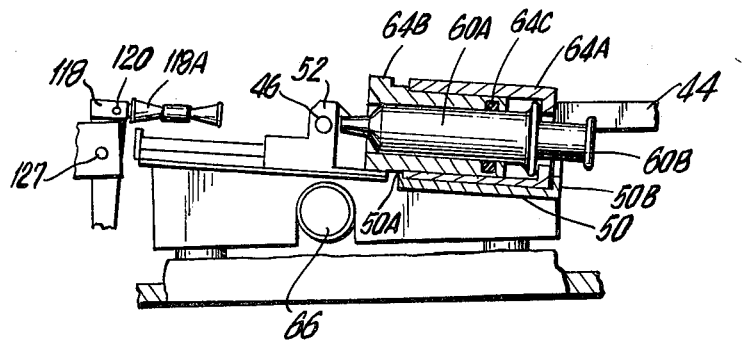
FIG. 4(c) shows a partial side cross-sectional view of another embodiment of the receiving vessel 60 and dispensing block assembly 118 shown in FIG. 4.

In another preferred embodiment of the apparatus of this invention, receiving vessel 60 may comprise a syringe barrel 60A and plunger 60B as illustrated in FIG. 4(c). Also shown in FIG. 4(c) are needle block 118, adapter 118A saddle block 50, saddle block flanges 50A and 50B, shielding members 64A and 64B, O-ring 64C, yoke 52 and pin 46. Syringe barrel 60A fits within shielding member 64B and is held in place by O-ring 64C. O-ring 64B fits within shielding member 64A. Shielding member 64A, containing shielding member 64B, O-ring 64C and syringe barrel 60A and plunger 60B, is placed onto saddle block 50 between flanges 50A and 50B. The portion of shielding member 64B extending beyond shielding 64A fits within yoke 52. In place of needle 132, adapter 118A is connected to needle block 118 and may comprise a conventional adapter which mates two male lure connections.

In a manner described hereinabove, yoke 52 is caused to move toward needle block 118 thereby drawing shielding member 64B containing syringe barrel 60A and plunger 60B out of shielding member 64A, bringing the male lure connection of syring barrel 60A into mating fit with adapter 118A. Sensing switch 130 senses the connection as described hereinabove and saline and technetium may be dispensed through adapter 118A into syringe barrel 60A. After dispensing is completed, yoke 52 is returned to its original position as described hereinbefore and syringe barrel 60A returns to its initial position within shielding member 64A. Shielding member 64A comprises a material which blocks radiation such as lead or the like and shielding member 64B may comprise as material which is transparent to radiation and preferably is optically transparent. The shielded syringe assembly shown in FIG. 4(c) may be placed onto or removed from saddle block 50 in a manner similar to that described with respect to the shielded dose vial 60.

With reference to FIGS. 9(a), 9(b) and 9(c), technetium detector 134 comprises a Geiger-Muller counting tube of conventional construction. Detector 134 measures radiation from the contents of glass capillary tube 140 containing concentrated technetium solution. The technetium detector 134 ordinarily operates at a potential of 900 volts. Hence, it is desirable that the pulses which it generates be interfaced to low level digital logic by means of conventional waveshaping circuit 314A. This circuit 314A operates essentially to couple the detector 134 through a capacitor to a conventional digital comparator (commercially available as LM339, National Semiconductor, Santa Clara, California). Such connection provides an output of typically 0–12 volts in amplitude for the duration of the geiger tube 134 output pulse through line 570.

The waveshaping circuit 314A output comprises a serial train of pulses through line 510 which are counted in a conventional digital counter 314B which may be binary or preferably binary coded decimal (BCD). The parallel outputs of a plurality or preferably, multiplicity of such counters are entered through lines 511 into conventional digital latches 314C after a suitable counting interval by a pulse on line 402 from a timing generator 300A as described hereinafter. The digital counters in the counter circuit 314B are then reset by a pulse on line 401 from a timing generator 300A as described hereinafter and the counting interval is repeated. It should be noted that units 314B and 314C, described in the singular, actually comprise a plurality of such units, as may other units described hereinafter.

Dose/background detector 66, waveshaping circuit 312A, digital counter 312B, digital latch 312C, and pulses on lines 406 and 405 correspond in their operation to the operation of detector 66, waveshaping circuit 314A, digital counter 314B, digital latch 314C and pulses on lines 402 and 401, respectively. In the same manner, lines 570, 510, 511 and 512 correspond to lines 575, 518, 514 and 515. Latch set pulse 406 and counter reset pulse 405 are also from a timing generator 300A. An arrow is employed for line 511, for example, to illustrate that a number of lines are present and represented by 511.

Dose selector switches 318A comprising switches 24 and 26 are on the control panel of assembly 10 and are set by the operator to select the desired dose. The switches are thumbwheel BCD coded switches. Two sets of switches provide capacity for handling unit's and ten's digits. Calibration switches 316A, typically Dual In-Line package (DIP) switches are located in the assembly 10 (not shown) and are used during calibration of the apparatus.

The outputs of the digital latches 312C and 314C, digital counter circuit 312B, and switches 318A and 316A are coupled to a common bus line (501, 502, 503, 504) through their respective three-state buffers, 312D, 314D, 312E, 318B and 316B. A three-state buffer is a conventional device which is used to isolate selected circuits from a common point. For example, during the course of computations, a number stored in a digital latch may be needed. The respective digits are connected to signal lines 501, 502, 503 and 504 as a binary or BCD number with bits in parallel and transferred one digit at a time in the desired sequence. The sequence is determined by pulses applied on control lines 403, for example, from the Read-Only Memory 300D through a digital latch 300E. Similarly, the remaining buffers are utilized as required when operated by control lines 404, 407, 408, and 409.

Information from the Read-Only Memory 300D can also be entered on bus lines 501, 502, 503, and 504 through a digital latch 300E via signal lines 818 and three-state buffer 300G via signal lines 822 when required. The Read-Only memory 300D is a conventional device which has been modified by a suitable programming procedure to contain a unique pattern of stored binary numbers. When an input is addressed with a given binary code, the output is a specific binary number which corresponds to the desired step in a sequence of operations. The output is applied to corresponding digital circuitry and the signal levels corresponding to each bit of the binary output cause the digital circuitry to operate in the desired manner.

A discussion of the use of Read-Only Memories may be found in Motorola Application Note An-722 "Replacing Sequential Logic with ROMS," Motorola, Inc., 1974 and Texas Instruments Bulletin CB-162 "Designing with TTL PROMS and ROMS from Texas Instruments," TI Supply, 2 Huntington Quadrangle, Huntington Station, N.Y. 11746, both herein incorporated by reference.

Signals lines 501, 502, 503 and 504 go to the calculator input interface circuit 302A which is essentially a combination of conventional multiplexers operated by control lines 610 from the Read-Only Memory 300D via signal lines 818 through digital latch 300E via signal lines 822 in conjunction with scanning signals on lines 611 from circuit 302C such that the binary or BCD code on lines 501, 502 503 and 504 is converted to suitable pulses applied on calculator input lines 612, 613 and 614. The calculator circuit 302B is a device of the type used in pocket calculators (commercially available as calculator circuit C-595 from General Instrument Corp., 600 W. John St., Hicksville, N.Y.) and requires input 302A and output 302C interface circuits to accommodate its signal level requirements. The output signals on lines 615 of the calculator circuit 302B go to the calculator output interface circuit 302C. Circuit 302C comprises resistors and non-inverting buffers and a Read-Only Memory which has been modified so as to convert the calculator output into a BCD code on lines 601, 602, 603 and 604. Part of the calculator output comprises scanning signals on lines 611 which are fed back to the input interface circuit 302A and also to the shift register timing generator 300J.

The signals present on lines 601, 602, 603 and 604 are BCD parallel signals from circuit 302C presented serially, one digit at a time. In order to render these signals into a form more suitable for further processing, the signals are converted into parallel digits. Thus, there are parallel digits as well as parallel BCD bit outputs 617. Signals on lines 601, 602, 603 and 604 are presented to the input of a serial to parallel shift register 300K. The timing signals on lines 616 that operate the shift register 300K are produced by a shift register timing generator 300J. Generator 300J comprises conventional flip-flops in conjunction with AND-gates and OR-gates arranged so as to generate suitable pulses on lines 616 which shift data through the shift register 300K. The timing generator 300J is controlled by signal 609 from the Read-Only Memory 300D via signal lines 818 and digital latch 300E. Preferably, signal 609 causes data to shift into the shift register 300K until a decimal point appears from scanning signals on lines 611 in order to truncate the number by dropping the fractional part of the calculation which terminates the train of shift pulses on lines 616.

A suitable number of digits is now present in the serial to parallel shift register 300K. The output 617 is now presented to both a conventional presettable down counter 308A and a digital latch 304A. When it is desirable to display digits, a pulse on line 608 from the Read-Only Memory 300D and latch 300E stores the number in a digital latch 304A from which, through a BCD to decimal converter 304B via signal lines 830 and suitable display drivers 304C, via lines 832 numbers are illuminated in the display module 30 via lines 834 on the control panel.

When the digits correspond to the number of stepping motor steps calculated by circuit 302B under control of Read-Only Memory 300D which steps are to be applied to the stepping motor 270 through motor driving unit 308, pulse signal on line 605 from the Read-Only Memory 300D and latch 300E causes the number to be preset into the presettable down counter 308A via lines 617. Pulse train on line 606 from the timing generator 300A is then applied to the down counter 308A and is mounted until the counter 308A reaches a value of zero. Pulse train on line 606 is simultaneously applied to a motor encoder 308B which is conjunction with signal on line 607 from the Read-Only Memory 300D and latch 300E causes suitable other pulse trains on lines 618 to be applied to the motor driver 308C and in turn to the stepping motor 270 via lines 620 such that the motor 270 will turn in the desired direction. The motor encoder 308B comprises conventional flip-flops in conjunction with conventional AND-OR select gates and inverters. A conventional device suitable for motor driver 308C which may be employed in this invention may be the Texas Instruments SN 75462 (commercially available from TI Supply, 2 Huntington Quadrangle, Huntington Station, N.Y.)

The solenoids 171, 172 and 174 and solenoid valves 225 and 226 are driven from the Read-Only Memory 300D via signal lines 818 through a latch 300E via lines 820 and suitable drivers 310 via lines 824. Devices such as the Texas Instruments SN 75462 (commercially available from TI Supply, 2 Huntington Quadrangle, Huntington Station, N.Y.) may be employed for the solenoid drivers 310. The sequencing of the Read-Only Memory 300D through the desired steps is accomplished by utilizing a part of the memory to contain a pattern of binary numbers which corresponds to the desired sequence and feeding back the output corresponding to the next address to a latch 300C containing the current memory address, the output fed through lines 619, gating 300F and lines 620. The latches 300C and 300E are operated by pulses via lines 621 and 622 from the timing generator 300A in a manner so as to cause the new address to enter the input latch 300C when the previous step has been completed.

The timing generator 300A comprises conventional binary counters and flip-flops arranged such that in conjunction with pulses via line 828 from a conventional oscillator 300B of fixed frequency and with control signals on lines 702 from the Read-Only Memory 300D and latch 300E, suitable pulses on lines 401, 402, 405, 406, 606, 621, 622, for the control of associated digital circuitry are produced.

The next address from digital latch 300E for the memory is fed back through line 619 and interrupt gating 300F such as AND-OR select gates. In conjunction with signals on lines 701 from the interrupt generator 300I via lines 816 this address forces the memory 300D to go to specific address locations in order to utilize certain portions of the stored program such as, for example, when the start button 22 is activated. The interrupt generator 300I comprises flip-flops and OR-gating and inverters connected so as to generate suitable pulses on lines 701 when the associated switches such as the start switch 22, checksource switch 903, via return sense switch 40 and vial sense switch 130 are operated.

The message gating circuit 300H comprises conventional AND, NAND, OR gates which in conjunction with sense switches 130, 40 and 903 and 22 via lines 806, 804, 802, 800 and timing pulses on line 623 from generator 300A cause suitable messages indicating the status of the instrument to appear on the message display 30 through lines 812 to message drive 304D and via lines 814 to the message display 30.

The sequence of operations is as follow: Sliding panel 12 is opened and a shielded dose vial 60 is placed onto saddle block 50. Sliding panel 12 is closed. By movement of operating lever 34 from a first position to a second position, vial 60 is drawn out of shield container 64 and the cap 62 of vial 60 is impaled by the hypodermic needle 132, activating sense switch 130. Vial sense switch 130 permits start switch 22 to operate interrupt generator 300I. The desired dose to be dispensed is then selected by operation of dose selection switches 318A (corresponding to thumbwheel switches 24 and 26 on the control panel of the assembly 10).

The start switch 22 is then activated. Upon activation of start switch 22, a pulse on lines 701 from interrupt generator 300I causes interrupt gating 300F to force memory 300D to go to its starting point. Also, message gating 300H causes message driver 304D to display a suitable message in display window 30 indicating that a dose is being prepared. This action of start switch 22 through interrupt generator 300I interrupts the Read-Only Memory 300D operation and forces the input address to be that of the starting point of the program sequence which will result in a dispensed dose of preselected volume and concentration. The program sequence solves the equation:

$$T = \frac{K_4(N_1 - B)}{1 - D(N_1 - B)}$$

wherein T is the computed source concentration measured in capillary tube 140 by detector 134; the number T is stored in digital latch 304A for display area 30; $N_1$ is the stored number of counts of technetium activity in capillary tube 140 which are stored in digital latch 314C via digital counter circuit 314B and lines 511; B and D are as defined hereinbefore; and $K_4$ is a constant determined during the calibration of the apparatus of this invention.

During the idle state of the assembly 10, the equation $$T = \frac{K_4(N_1 - B)}{1 - D(N_1 - B)}$$

is repeated computed and displayed in display area 30. When start button 22 is activated, the apparatus stops this computation and Read-Only Memory 300D is forced into a program step as described above which causes the computation unit 302 to begin computing the equation:

$$Tc \text{ motor steps} = \frac{K_1(\text{selected dose})}{Tc \text{ counts}} - K_2(\text{selected dose})$$

as defined hereinabove which gives the number of steps required for the stepping motor to turm and pick-up or dispense technetium or the like. A suitable program sequence according to the present invention may be as follows:

1. Calculator circuit 302B is cleared on command from Read-Only Memory 300D via lines 818 to digital latch 300E, from 300E via lines 822 to three state buffer 300G, from 300G via lines 501–504 to calculator input interface circuit 302A, and from 302A via lines 612–614 to calculator circuit 302B.

2. Calculator memory is then cleared in the same manner.

3. On command from Read-Only Memory 300D via lines 818 to digital latch 300E, from 300E via lines 403 to three state buffer 314D, from 314D via lines 501–504 to calculator input interface circuit 302A, and from 302A via lines 612–614 to calculator circuit 302B, the number stored in technetuim latch 314C is entered in calculator 302B. The number has been counted by technetium counter 314B and stored in 314C.

4, 5, 6. commands to multiply by 10 and subtraction of step 7 are then entered into calculator 302B by the same command sequence of steps 1 and 2.

7. The number stored in background latch 312C is entered into calculator circuit 302B via lines 515 to three-state buffer 312D by command of Read-Only Memory 300D as in step 3.

8, 9, 10, 11. The entry of step 7 is added to calculator 302B memory; the calculator 302B is cleared and the number 10 is entered and a multiply command entered as in step 4.

12. The dose selection switch value 318A is entered into calculator cirucit 302B via lines 516 to threestate buffer 318B on command fromm Read-Only Memory 300D via lines 408 in a manner similar to that of step 7.

13, 14, 15, 16, 17. The commands for division, memory recall, clear memory, add to memory, clear calculator are entered in calculator circuit 302B in a manner similar to step 4.

18. The recovery time calibration constants for geiger tubes 66 and 134 which are part of calibration switches 316A are entered into calculator circuit 302B via lines 517 and three-state buffer 316B on command from Read-Only Memory 300D via lines 409 in a manner similar to step 7.

19. The command to multiply is entered in calculator circuit 302 in a manner similar to step 4. 20. The dose selection switch value is entered as in step 12.

21, 22, 23, 24. The command to divide, enter 1000000, subtract from calculator circuit 302B memory, clear calculator 302 are entered in a manner similar to step 4.

25. The Tc motor step computation calibration switch 316A value is entered in a manner similar to step 18.

26, 27, 28, 29, 30, 31. The commands to multiply, recall calculator circuit 302B memory, enter multiply, enter 1000, clear calculator circuit 302B memory and add to memory are entered in calculator circuit 302B in a manner similar to step 4.

32. The output on lines 601–604 of circuit 302B is entered into shift register 300K by pulses on lines 616 from shift register timing generator 300J on command from Read-Only Memory 300D via lines 609.

33. The down counter 308A is preset with the number on lines 617 on command from Read-Only Memory 300D via line 605.

34. Solenoid valve 225 is switched to communicate with diaphragm assembly 144 on command from Read-Only Memory 300D via lines 824 from solenoid drivers 310.

35. Pinch valve 154 is closed by solenoid 174 in a manner similar to step 34.

36. Stepping motor 270 is operated such that syringe barrel 188 fills, by command from Read-Only Memory 300D via line 607 to motor encoder 308B and lines 618 to motor driver 308C and lines 620 to motor 270. Simultaneously, down counter 308A counts pulses on line 606 from timing generator 300A.

37. When down counter 308A reaches zero, stepping motor 270 is stopped by a command from Read-Only Memory 300D in a manner similar to that of step 36.

38. Pinch valve 151 is closed and pinch valve 153 is opened by solenoid 171 in a manner similar to step 34.

39. Pinch valve 152 is opened by solenoid 172 in a manner similar to step 34.

40. Down counter 308A is preset in a manner similar to step 33.

41. Stepping motor 270 is operated such that syringe barrel 188 empties in a manner similar to that of step 36.

42. When down counter 308A reaches zero, stepping motor 270 is stopped in a manner similar to that of step 37.

A volume of technetium solution has now been dispensed into the dose vial 60.

43. Valve 225 is switched to communicate with diaphragm assembly 146 in a manner similar to that of step 34.

44. Pinch valve 152 is closed by solenoid 172 in a manner similar to step 34.

45, 46, 47, 48, 49. Command to clear calculator, enter the number 5200, enter subtraction, recall calculator circuit 302B memory, enter equal are entered into calculator circuit 302B in a manner similar to step 4.

50, 51, 52, 53. Steps 32, 33, 36 and 37 are repeated.

54. Pinch valve 151 is opened and pinch valve 153 is closed by solenoid 171 in a manner similar to step 34.

55. Pinch valve 154 is opened by solenoid 174 in a manner similar to step 34.

56, 57, 58. Steps 33, 41 and 37 are repeated.

A volume of saline sufficient to reach the desired volume has now been dispensed into the dose vial 60. In a manner similar to the above, the syringe barrel 188 is now caused to empty an additional volume of approximately 100 microliters into the vial 60 and then to fill the dispensing needle 132 with an equal volume of air from the vial by the plunger within barrel 188 returning to its starting point. The reason for this is that when elastic tubing is used for fluid interconnection, the back pressure developed in the vial 60 by the displacement of air by liquid is taken up by expansion of the tubing. When the vial 60 is removed from the needle 132, retraction of the tubing walls would cause any liquid left in the needle to exit and spray the vial cap 62, an undesirable effect.

The next Read-Only Memory 300D step causes the radiation from the dose vial 60 detected by the dose background counter 66 to be counted for in a fixed interval in the order of seconds. At the end of this interval, in a manner similar to the above discussion, the activity of the dose is calculated and the result shifted into the shift register 300K and stored in the display latch 304A. the activity then appears on the control panel along with a message that the dose is ready.

The operating handle 34 is returned to its original position, releasing the vial sense switch 130 and activating the vial return sense switch 40 which interrupts the Read-Only Memory 300D program and forces it into the idle state of the apparatus. Simultaneously, the vial 60 is returned to its shield 64. Shielded vial 60 may now be removed by opening sliding panel 12.

In order to test the functioning of the assembly 10, a cheeksource button 465, when pressed, moves a low activity long-loved radioactive source 471 into a position over a hole 470 in the shield 468 of the dose/background detector 66. Simultaneously, the checksource sense switch 903 is activated, interrupting the Read-Only Memory 300D program and forcing into the starting point of a portion of the stored program which in a manner similar to the above discussion, causes the checksource radiation to be counted and an equivalent activity to be calculated and displayed. If the number displayed is correct, as previously determined during calibration of the apparatus, then the operator is assured that the system is functioning properly. Releasing the checksource button 465 causes the checksource 471 to return to a shielded position and releases the sense switch 903 which then interrupts the Read-Only Memory 300D forcing it into an idle state address.

What is claimed is:

1. Apparatus for dispensing a discrete quantity of a radioactive dose solution to a receiving vessel in response to a selection of the desired activity of said dose solution, said apparatus comprising:
    reagent vessel means adapted to contain a radioactive source solution;
    diluent vessel means adapted to contain a liquid diluent;
    first detector means for measuring the activity of a radioactive medium for a predetermined time period;
    first counting means responsive to said first detector means for automatically counting said activity of said radioactive medium;
    first display means for displaying said counted activity;
    dose selection means responsive to the selection of the desired activity for said dose solution, said activity selected being no greater than said displayed activity;
    first calculating means responsive to said dose selection means for automatically calculating a first quantity of said radioactive source solution and a second quantity of said liquid diluent, which, when combined, will provide said discrete quantity of said dose solution having said selected activity;
    first measuring means responsive to said to said calculating means for measuring out said first quantity;

first dispensing means responsive to said first measuring means for dispensing said measured first quantity into said receiving vessel;

second measuring means responsive to said first calculating means for measuring out said quantity; and second dispensing means responsive to said second measuring means for dispensing said measured second quantity into said receiving vessel.

2. Apparatus as defined in claim 1 further including:
second detector means for measuring activity of said receiving vessel for a predetermined time period;
second counting means responsive to said second detector means for automatically counting said measured activity; and
means for displaying said second counted activity;

3. Apparatus as defined in claim 1 wherein said radioactive source solution comprises technetium-99m solution, said liquid diluent comprises a salines or aqueous solution and said first and second detector means comprise Geiger-Muller tubes.

4. Apparatus as defined in claim 3 wherein said receiving vessel comprises a vial housed within a shielding jacket.

5. Apparatus as defined in claim 3 wherein said receiving vessel comprises a hypodermic syringe housed within a shielding jacket.

6. Apparatus as defined in claim 2 further including:
third detector means for measuring any molybdenum activity in said receiving vessel in response to said second dispensing means for a predetermined time period;
third counting means responsive to said third detector means for automatically counting said molybdenum activity; and
third display means responsive to said third counting means for displaying said counted molybdenum activity.

7. Apparatus as defined in claim 2 further including:
a low level source of known radioactivity; and
means for bringing said radioactive source into range of said second detector means so that its activity may be counted by said second counting means and displayed by said second display means.

8. Method for dispensing a discrete quantity of a radioactive dose solution to a receiving vessel in response to a selection of the desired activity of said dose solution, said method comprising:
providing a reagent vessel adapted to contain a radioactive source solution;
providing a diluent vessel adapted to contain a liquid diluent;
measuring the activity of a radioactive medium for a predetermined time interval;
automatically computing said measured activity;
displaying said computed activity;
selecting a dose concentration for said radioactive dose solution no greater than said displaced activity in response to said displayed activity.
automatically calculating a volume of said radioactive source solution and a volume of said diluent solution which when combined will provide said discrete quantity of said dose solution having said manually selected concentration;
measuring out said calculated volume of said radioactive source solution; and
transferring said measured volume of said radioactive source solution into said receiving vessel; and
measuring out said calculated volume of said diluent liquid into said receiving vessel.

9. Apparatus for dispensing a discrete quantity of a radioactive dose solution to a receiving vessel in response to selection of the desired activity of said dose solution, said receiving vessel having an inlet port and being at least partially housed within a shielding jacket, said apparatus comprising:
reagent vessel means adapted to contain a radioactive source solution;
diluent vessel means adapted to contain a liquid diluent;
support means adapted to support said receiving vessel;
means to move said supported receiving vessel between a first predetermined position and a second predetermined position;
dispensing means for dispensing a first quantity of said radioactive source solution and a second quantity of said liquid diluent into said receiving vessel, said dispensing means adapted to communicate with said inlet port of said receiving vessel whenever said supported receiving vessel is in said second position;
sensing means adapted to be activated whenever said supported receiving vessel is in said second position;
first detector means for measuring the activity of a predetermined volume of a radioactive medium for a predetermined time period;
second detector means for measuring background activity continuously;
first counting means responsive to said first detector means for automatically counting said activity of said radioactive medium;
second counting means responsive to said second detector means for automatically counting said background activity;
first computation means responsive to said first and second counting means for substracting said counted background activity from said counted activity of said radioactive medium in computing concentration of said predetermined volume of said radioactive medium;
first means for displaying said computed concentration of said radioactive medium;
dose selection means responsive to the selection of the desired concentration for said dose solution up to said displayed concentration;
first calculating means responsive to said dose selection means for automatically calculating said first quantity of said radioactive source solution and said second quantity of said liquid dilune which, when combined, will provide said discrete quantity of said dose solution having said selected concentration;
a first housing comprising first and second chambers, said first chamber communicating with said reagent vessel means and said dispensing means;
a second housing comprising third and fourth chambers, said third chamber communicating with said diluent vessel means and said dispensing means;
a first valve means situated between said reagent vessel means and said first housing and adapted to move between a first closed position shutting off communication therebetween and a first open position permitting communication therebetween;

a second valve means situated between said first housing and said dispensing means and adapted to move between a second closed position shutting off communication therebetween and a second open position permitting communication therebetween;

a third valve means situated between said second housing and said diluent vessel; said third valve means adapted to move between a third closed position shutting off communication therebetween and a third open position permitting communication therebetween;

a fourth valve means situated between said second housing and said dispensing means, said fourth valve means adapted to move between a fourth closed position shutting off communication therebetween and a fourth open position permitting communication therebetween;

a first actuator means adapted to move said first valve means between said first open and closed positions;

a second actuator means adapted to move said second valve means between said second open and closed positions;

a third actuator means adapted to move said third valve means between said third open and closed position;

a fourth actuator means adapted to move said fourth valve means between said fourth open and closed positions;

a pump means communicating with the second and fourth chambers of said first and second housing, respectively; said pump means having reciprocally movable means to enable intake and dispensing of liquid through said second and fourth chambers, respectively;

a first electrically operable valve means situated between said pump means and said second chamber of said first housing; said first electrically operable valve means adapted to move between a fifth predetermined position permitting communication between said pump means and said second chamber and a sixth predetermined position shutting off communication therebetween;

a second electrically operable valve means situated between said pump means and said fourth chamber of said second housing; said second electrically operable valve means adapted to move between a seventh predetermined position permitting communication between said pump means and said fourth chamber and an eighth predetermined position shutting off communication therebetween;

an electrically operable motor means engaged to said reciprocally movable means of said pump means and adapted to rotate in an initial direction, said electrically operable motor means further adapted to rotate in a direction opposite to its initial direction;

means responsive to said rotation of said motor means in said initial direction to (a) cause said radiocative source solution to be drawn from said reagent vessel means when said first electrically operable valve means is in said fifth predetermined position, when said second electrically operable valve means is in said eighth predetermined position, when said first valve means is in said first open position and when said second valve means is in said second closed position and (b) cause said liquid diluent to be drawn from said diluent vessel means when said first electrically operable valve means is in said sixth predetermined position, when said second electrically operable valve means is in said seventh predetermined position, when said third valve mens is in said third open position and when said fourth valve means is in said fourth closed position; said means responsive to said rotation of said motor means in a direction opposite to said initial direction to (c) cause said radioactive source solution to be dispensed into said receiving vessel when said first electrically operable valve means is in said fifth predetermined position, when said second electrically operable valve means is in said eight predetermined position, when said first valve means is in said first closed position and when said second valve means is in said second open position and (d) cause said liquid diluent to be dispensed into said receiving vessel when said first electrically operable valve means is in said fifth predetermined position, when said second electrically operable valve means is in said eight predetermined position, when said third valve means is in said third closed postion and when said fourth valve means is in said fourth open position; and electrical control means responsive to said first calculating means and adapted to be activated whenever said sensing means is electrically activated for rotating said motor means.

10. Apparatus as defined in claim 9 further including:
third detector means for measuring activity of
said liquid solution in said receiving vessel for a predetermined time period;
third counting means responsive to said third detector means for automatically counting said activity of said liquid solution;
second computation means responsive to said second and third counting means for substracting said counted background activity from said counted activity of said liquid solution in computing the concentration of said liquid solution; and
second means for displaying said computed concentration of said liquid solution.

11. Apparatus as defined in claim 10 further including:
fourth detector means for measuring any molybdenum activity in said receiving vessel in response to said electrical control means for a predetermined time period;
fourth counting means responsive to said fourth detector means for automatically counting said molybdenum activity; and
third display means responsive to said fourth counting means for displaying said counted molybdenum activity.

12. Apparatus as defined in claim 10 further including:
a low level source of known radioactivity; an
means for bringing said low level radioactive source into range of said second detector means whereby its activity may be counted by said second counting means, its concentration computed by said second computation means and displayed by said second display means.

13. Apparatus as defined in claim 9 wherein said support means for said receiving vessel is inclined from the horizontal between about 0° and about 90°.

14. Apparatus as defined in claim 13 wherein said angle is between about 4° and 10°.

15. Apparatus as defined in claim 9 wherein said dispensing means comprises a needle block and hypodermic needle, said hypodermic needle being attached to said needle block, said needle block being connected to said first and third chambers.

16. Apparatus as defined in claim 9 wherein said first detector means comprises a Geiger tube, a capillary tube and a shielding shroud having a slot therein, said shroud interposed between said capillary tube and said Geiger tube.

17. Apparatus as defined in claim 16 wherein said capillary tube is selected from the group of materials consisting of metals, plastics and glass.

18. Apparatus as defined in claim 9 wherein said second detector means comprises a Geiger tube and a shielding shroud having a slot therein said shroud interposed between said Geiger tube and said receiving vessel.

19. Apparatus as defined in claim 9 wherein said communication means between said second chamber of said first housing, said fourth chamber of said second housing, and said pump means comprises a flexible tubing, said flexible tubing containing an incompressible fluid therein.

20. Apparatus as defined in claim 19 wherein said incompressible fluid comprises silicone, water or a low viscosity, non-corrosive liquid whose viscosity is no greater than about ten times the viscosity of water.

21. Apparatus as defined in claim 9 further comprising a second sense switch adapted to be activated whenever said pump means is in a predetermined position; and second electrical control means responsive to said second sense switch means to return said first electrical control means to its initial state.

22. Apparatus as defined in claim 9 wherein said radioactive source solution comprises technetium-99m solution; said diluent solution comprises saline solution; said first, second, third and fourth actuator means each comprise first, second, third and fourth solenoid drive means; and
said motor means comprises a stepping motor.

* * * * *

UNITED STATES PATENT OFFICE
CERTIFICATE OF CORRECTION

Patent No. 3,997,784　　　　　　　　　Dated December 14, 1976

Inventor(s) Thomas Picunko et al.

It is certified that error appears in the above-identified patent and that said Letters Patent are hereby corrected as shown below:

Column 24, line 54, claim 9, "dilune" should read -- diluent --

Column 25, line 26, claim 9 "position" should read
-- positions --.

Column 26, line 57, claim 12, "an" should read -- and --.

Signed and Sealed this

Twenty-eighth Day of June 1977

[SEAL]

Attest:

RUTH C. MASON
*Attesting Officer*

C. MARSHALL DANN
*Commissioner of Patents and Trademarks*